US008287023B2

(12) United States Patent
Bixler et al.

(10) Patent No.: US 8,287,023 B2
(45) Date of Patent: Oct. 16, 2012

(54) APPARATUS FOR THE HANDICAPPED

(76) Inventors: Dick Bixler, Dodge City, KS (US); Nancy Cudney, Dodge City, KS (US)

( * ) Notice: Subject to any disclaimer, the term of this patent is extended or adjusted under 35 U.S.C. 154(b) by 302 days.

(21) Appl. No.: 12/618,249

(22) Filed: Nov. 13, 2009

(65) Prior Publication Data

US 2010/0116577 A1 May 13, 2010

Related U.S. Application Data

(60) Provisional application No. 61/114,116, filed on Nov. 13, 2008.

(51) Int. Cl.
*B62D 31/00* (2006.01)

(52) U.S. Cl. .................... 296/35.3; 296/103; 135/88.01; 135/88.03

(58) Field of Classification Search ................. 296/78.1, 296/102, 103, 180.1, 136.01, 136.02, 35.3; 135/88.01, 88.03, 88.05; 52/DIG. 14
See application file for complete search history.

(56) References Cited

U.S. PATENT DOCUMENTS 3,186,734 A * 6/1965 Touhey ...................... 280/460.1
4,949,740 A * 8/1990 Friday ............................. 135/90
5,297,844 A 3/1994 Haustein
6,105,721 A 8/2000 Haynes
6,206,446 B1 3/2001 Slayden
6,416,108 B1 * 7/2002 Elswick ..................... 296/96.21
6,779,310 B2 * 8/2004 Grover ........................... 52/79.4
6,922,610 B2 * 7/2005 Okamoto et al. ............. 700/245
7,090,279 B2 * 8/2006 Tahara ......................... 296/78.1
7,261,354 B1 * 8/2007 Lozano ...................... 296/26.05
2001/0035666 A1 * 11/2001 Allen ............................ 296/136

FOREIGN PATENT DOCUMENTS

IT 693139 * 8/1965 ................... 296/78.1
SU 1321672 * 7/1987

* cited by examiner

*Primary Examiner* — Dennis Pedder
(74) *Attorney, Agent, or Firm* — Fellers, Snider, Blankenship, Bailey & Tippens, P.C.

(57) ABSTRACT

An enhanced mobility device is disclosed. The device has an enclosure defining an interior and an exterior and having a floor defining an opening therein. At least one access opening allows passage between the exterior and interior. A plurality of clamps attach to the interior of the enclosure. The access opening is sized to allow passage of a personal mobility device from the exterior to the interior where the mobility device may be secured to the enclosure for transport by the plurality of clamps.

10 Claims, 26 Drawing Sheets

APPARATUS FOR THE HANDICAPPED

CROSS REFERENCE TO RELATED APPLICATIONS

This application claims the priority of U.S. Provisional Patent Application No. 61/114,116 entitled "APPARATUS FOR THE HANDICAPPED," filed Nov. 13, 2008, the contents of which are hereby incorporated by reference.

FIELD OF THE INVENTION

This disclosure relates to handicap aids in general and, more specifically, to devices for enhancing mobility of handicapped persons in the outdoors.

BACKGROUND OF THE INVENTION

Handicap mobility aids have, to date, largely consisted of devices that simply allow the handicapped to obtain mobility. Wheelchairs and motorized scooters allow non-ambulatory persons to move with a degree of freedom approximating that of a fully capable individual. Similarly, in an outdoor context, both handicapped and non-handicapped individuals may enjoy enhanced mobility and decreased fatigue by the use of all terrain vehicles, or ATVs.

A non-handicapped individual is generally free to mount and dismount the ATV for purposes of recreation, rest, or to pursue activities on foot, while a handicapped person may not be able to easily mount or dismount the ATV, and may be more or less dependent upon whatever may be within reach on the ATV. Similarly, a non-handicapped person can leave the ATV to obtain shelter from the elements while many handicapped persons may have to deal with whatever the weather brings, without being able to easily leave the ATV.

What is needed is a device for addressing the above, and related, concerns.

SUMMARY OF THE INVENTION

The invention of the present disclosure, in one aspect thereof, comprises an enhanced mobility device. The device has an enclosure defining an interior and an exterior and having a floor defining an opening therein. At least one access opening allows passage between the exterior and interior. A plurality of clamps are attached to the interior of the enclosure. The access opening is sized to allow passage of a personal mobility device from the exterior to the interior where the mobility device may be secured to the enclosure for transport by the plurality of clamps.

In some embodiments, the enclosure provides a plurality of observation windows. The enclosure may comprise two pieces in a telescoping arrangement configured to allow adjustment of the enclosure for height. In another embodiment, the enclosure comprises two pieces in a telescoping arrangement configured to allow for adjustment of the enclosure for length. In some embodiments, the plurality of clamps are configured to attach to a cargo rack of an all terrain vehicle. In other embodiments, the plurality of clamps are configured to attach to a wheelchair.

The device may further comprise an emergency signal indicator affixed to the exterior of the enclosure and activated from the interior of the enclosure. A plurality of extendable legs may be provided on at least one side of the enclosure for righting the enclosure in the event the enclosure tips onto the at least one side.

The invention of the present disclosure, in another aspect thereof, comprises a kit for use by a handicapped person for cover, mobility, and protection. The kit includes an enclosure having at least one entrance and a floor defining and opening, the entrance being sized to allow passage of a personal mobility craft and the floor opening being sized to allow the personal mobility craft to rest upon the ground while enclosed by the enclosure. The kit further includes at least one clamp on the interior of the enclosure adapted to clamp onto the personal mobility craft and allow the personal mobility craft to support the enclosure for transport. A floor piece is selectively and removably attachable to the enclosure to cover the floor opening and thereby provide a floor to the enclosure.

In some embodiments, the kit further comprises a chair attached to the floor piece and having a safety belt. The kit may include a winch attached to the enclosure and adapted to lift a user into and out of the enclosure via a second opening. The kit may also include a plurality of wheels attached to the enclosure and a tow hitch attached to the enclosure.

DETAILED DESCRIPTION OF THE PREFERRED EMBODIMENTS

Figure 1:
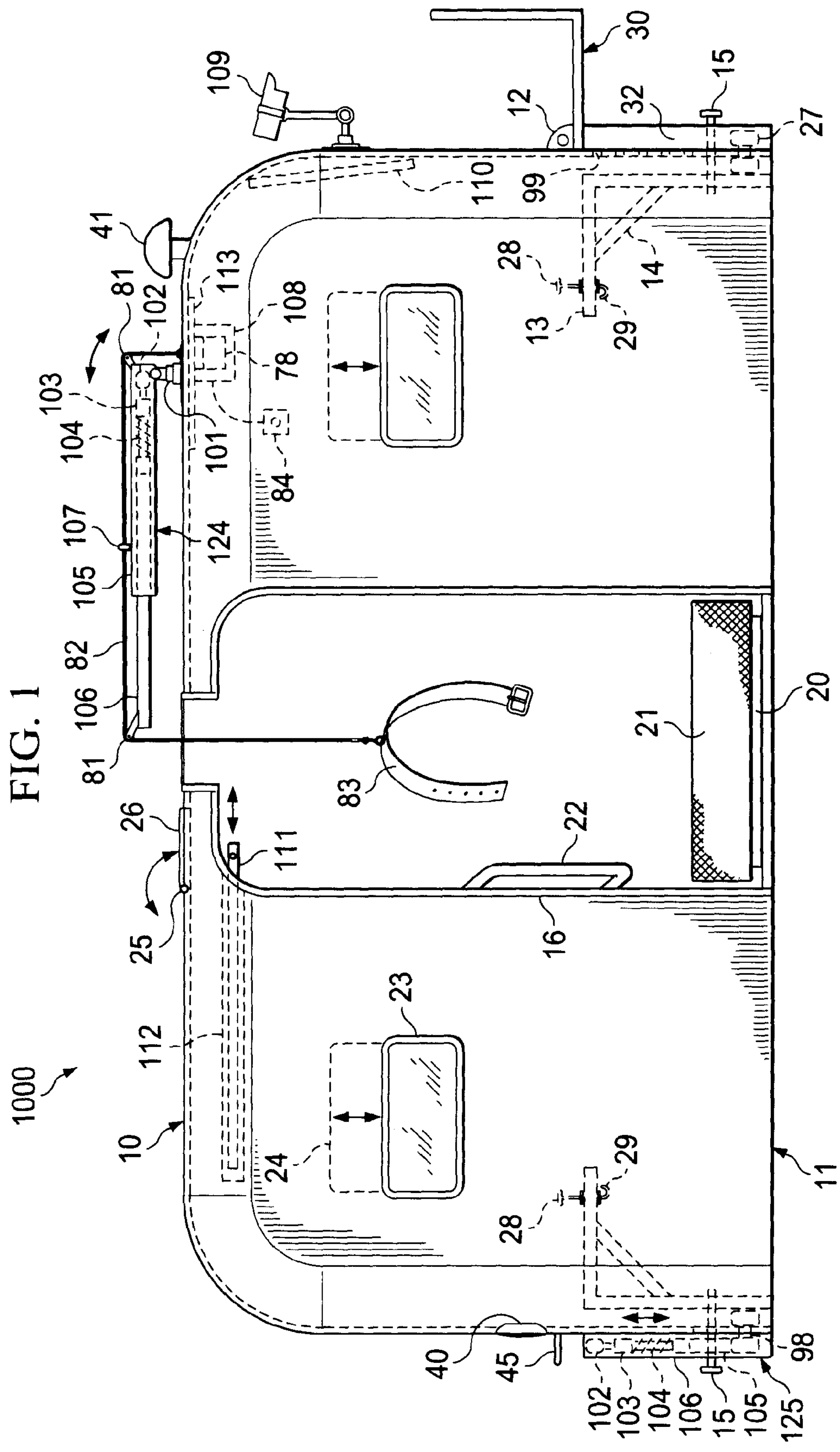
FIG. 1 is a side view of a handicap mobility device according to aspects of the present disclosure.
Figure 2:
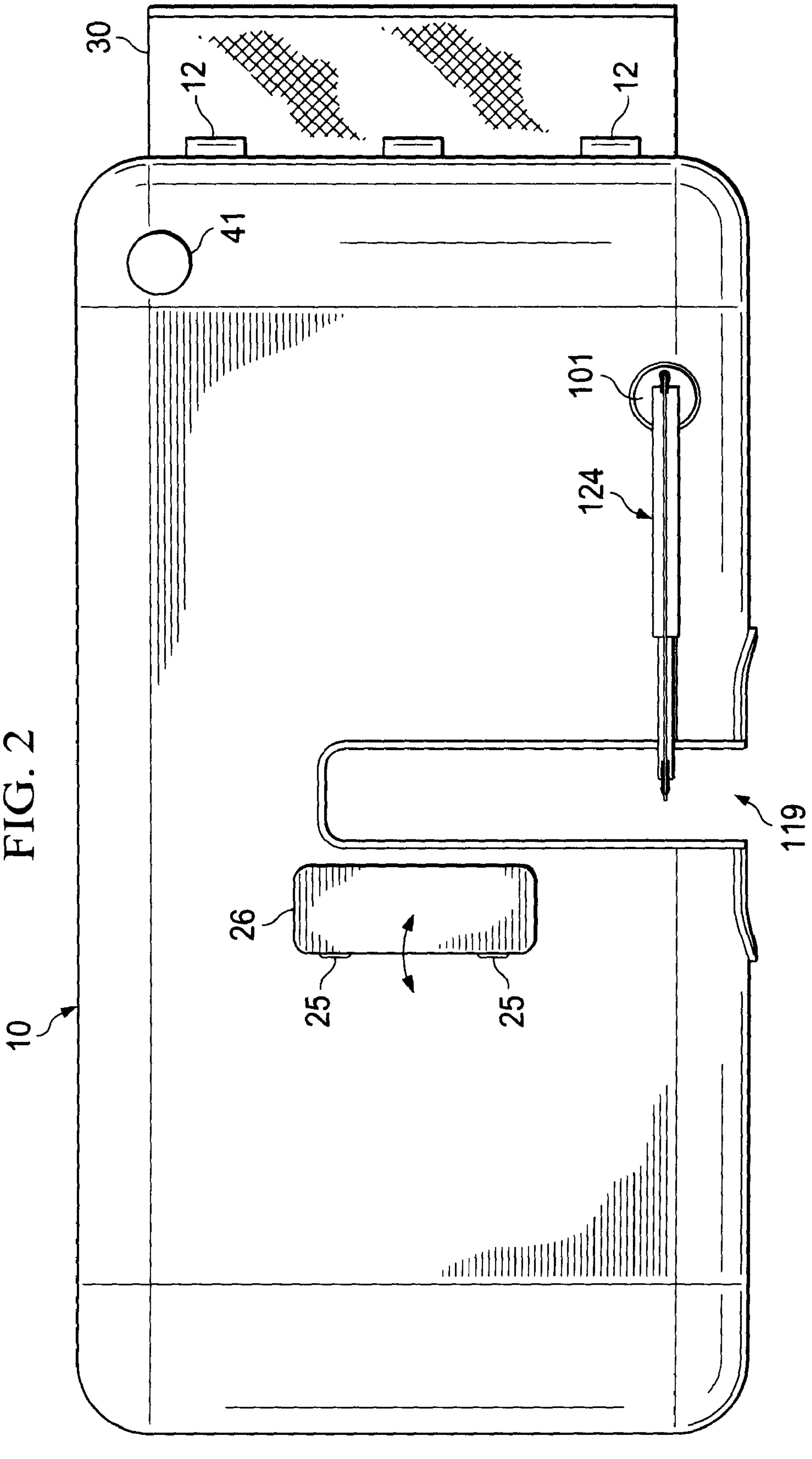
FIG. 2 is a top view of the device of FIG. 1.
Figure 3:
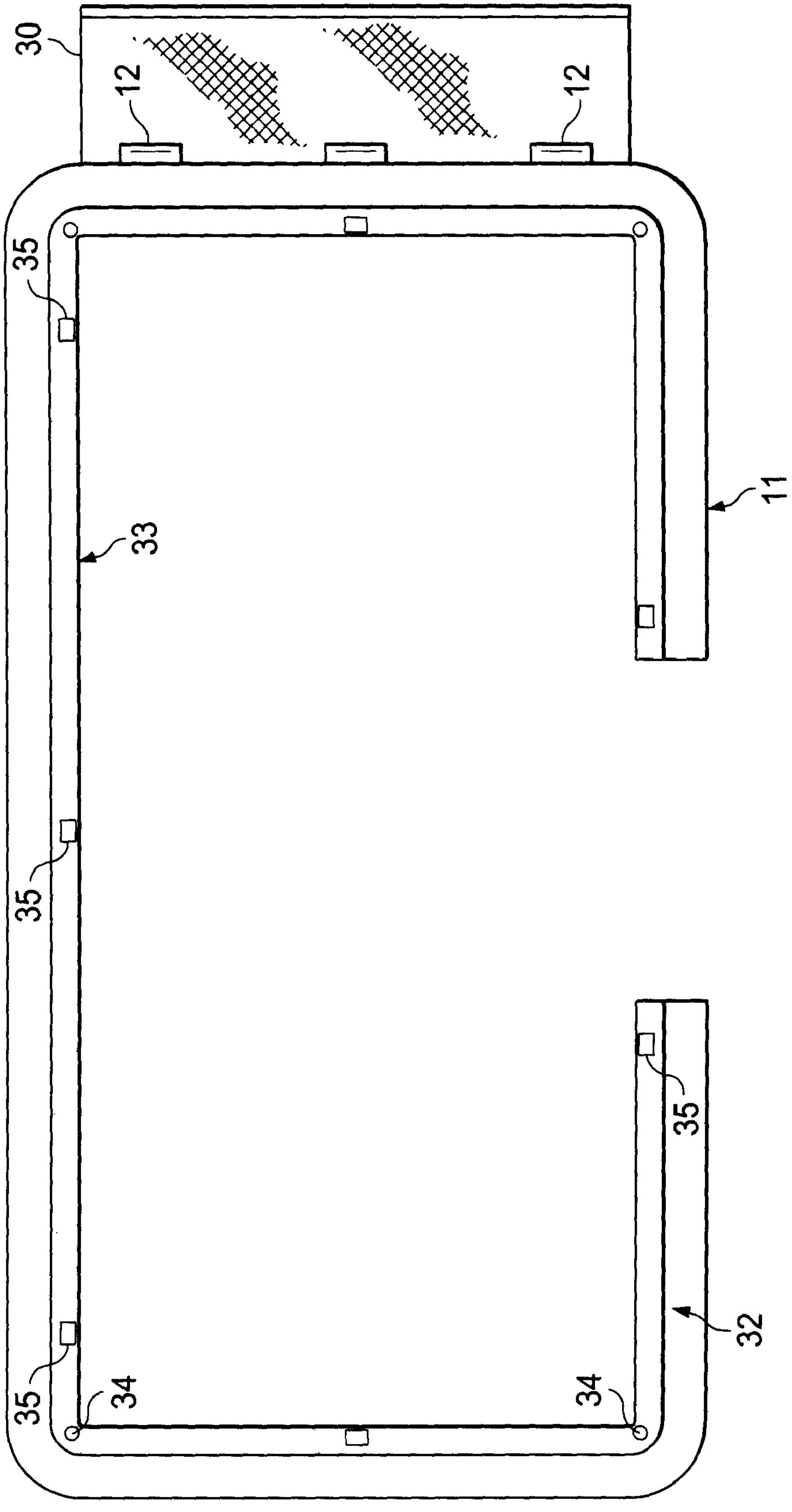
FIG. 3 is a top view of a lower portion of the device of FIG. 1.
Figure 4:
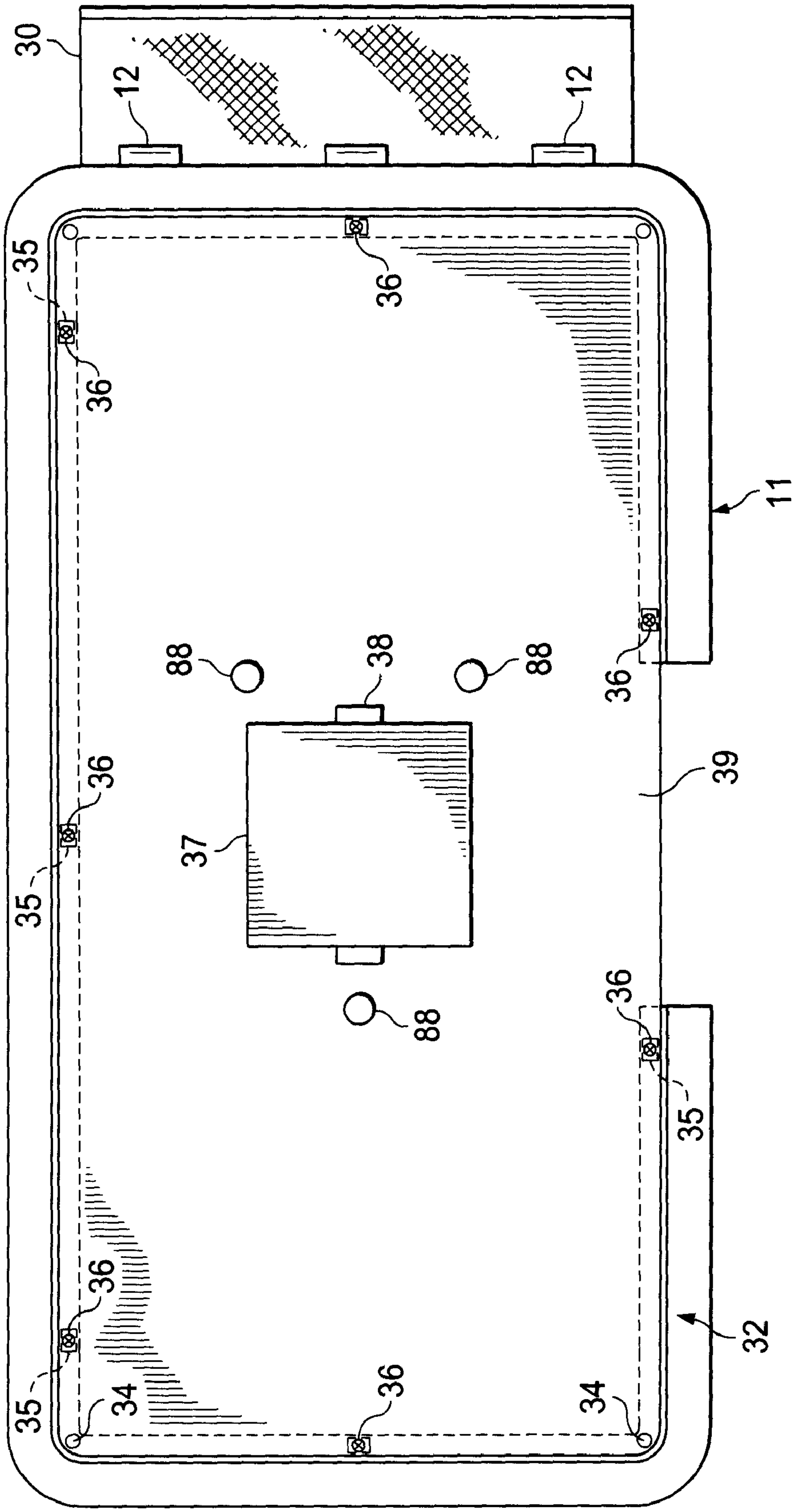
FIG. 4 is another top view of the lower half of the device of FIG. 1 showing an attached floor.
Figure 5:
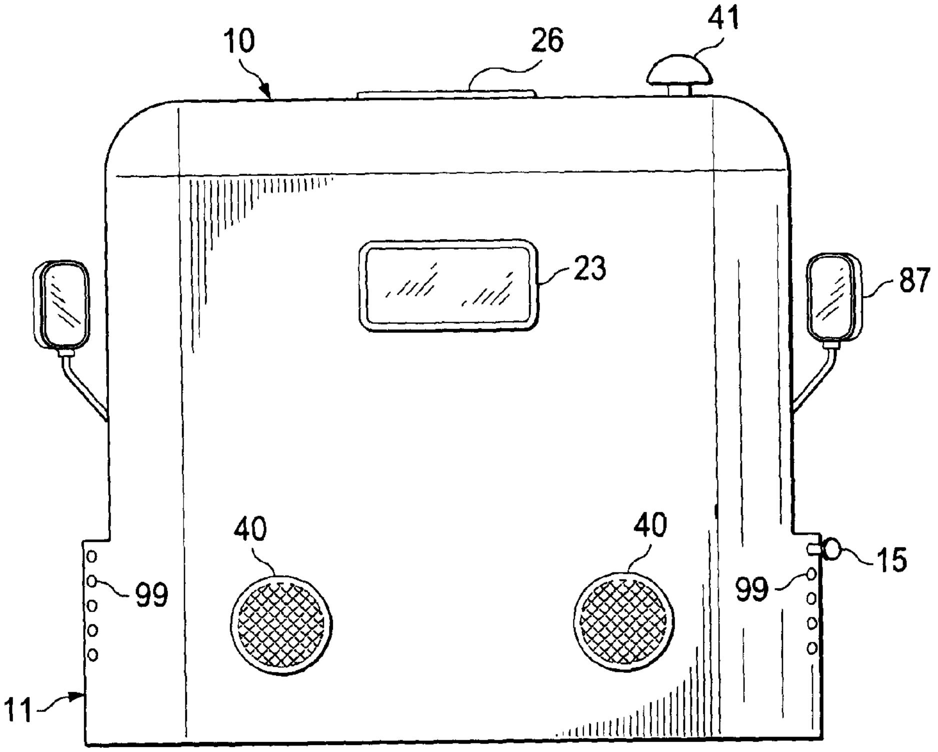
FIG. 5 is a front end view of the device of FIG. 1.

Referring now to FIG. 1, a side view of a handicap mobility device according to aspects of the present disclosure is shown. The device 1000 comprises an upper portion 10 and a lower portion 11 in the present embodiment. The upper portion 10 may be telescopically engaged with the lower portion 11 such that the device is height adjustable. Adjustment rollers 27 on internal track 32 may be provided to guide the upper portion 10 in proper alignment with the lower portion 11. A series of height adjustment holes 99 may also be provided for securing the upper portion 10 and the lower portion 11 into a desired height. A lock pin 15 may be provided for securely retaining the upper portion 10 and lower portion 11 in the prescribed relationship.

Figure 7:
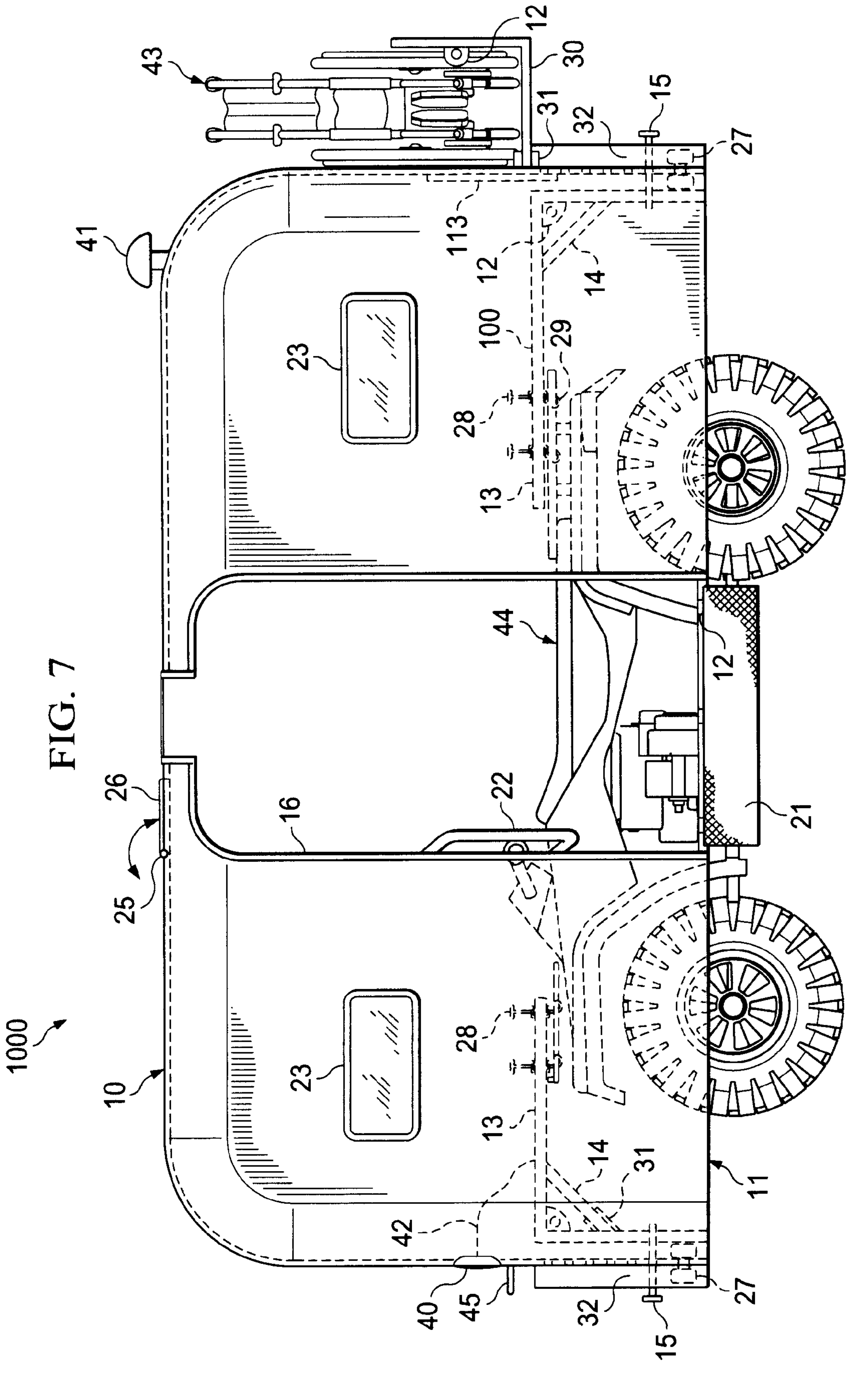
FIG. 7 is a side cutout view of the device of FIG. 1 attached to an all terrain vehicle.

Referring now also to the side view of FIG. 7, it can be seen that the device 1000 is adapted to be fitted to a personal mobility device 44. In the present example, the personal mobility device is an all terrain vehicle or ATV. However, it is understood that in other embodiments, the device 1000 may be sized to accommodate other personal mobility devices, such as motorized scooters, wheelchairs, snowmobiles, or other devices.

In the present embodiment, the device 1000 attaches to the ATV 44 by one or more clamps 29 that attach to an ATV rack 100 on the fore and aft ends of the ATV 44. The clamps 29 may be tightened by the clamp tightener 28 and attached to latch platforms 13. In some embodiments, a platform brace 14 may be needed to ensure structural integrity of the latch platform 13. Although clamps are utilized as an attachment means in the present embodiment, in other embodiments, other attachments means could be used including, but not limited to straps, vises, latches, hasps, pins, and bolts.

Figure 22:
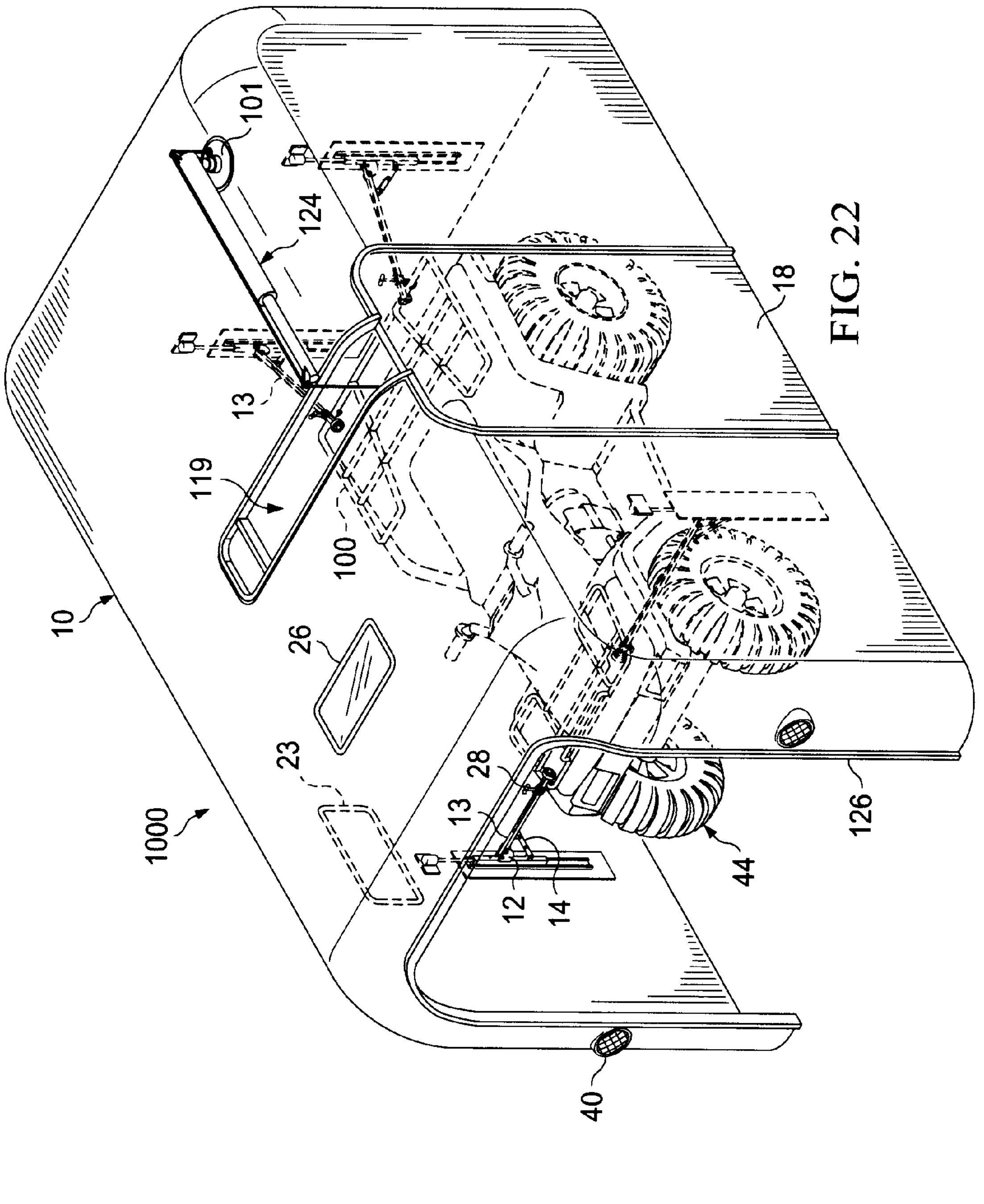
FIG. 22 is an end view of a handicap access device with an open access door illustrating an exemplary placement of an all terrain vehicle within the access device.

Referring now also to FIG. 22, an access door 126, by which the ATV 44 enters the enclosure 1000, can be seen. In the present embodiment, the ATV 44 may be backed into the enclosure 1000 and then attached by the aforementioned clamps 29 to the ATV 44. With reference back to FIG. 1, it may be seen how the upper portion 10 and lower portion 11 may be adjusted from within the device 1000. A screw motor 102 is provided with a female screw box 103 in conjunction with a male screw adjustment 104. These may be electrically powered for adjusting the height of the lower portion 11 relative to the upper portion 10. In one method of operation, the ATV 44 may be driven into the enclosure 1000 when the enclosure is in a state with the lower portion 11 telescoped upward into the upper portion 10. The height of the lower portion 11 within the upper portion 10 may be such that the latch platforms 14 are in close proximity to the ATV racks 100 or other attachment point. When the ATV or other mobility device has been securely clamped to the latch platform 13, the height adjustment mechanism may be electronically activated, which will lower the lower portion 11 downward out of the upper portion 10. As a result of the lower portion 11 being securely affixed to the ATV 44, the upper portion 10 will be lifted clear of the ground or other support surface such that the weight of the enclosure 1000 will rest upon the ATV 44. From this point, the ATV rider may travel within the enclosure 1000 with access to the protection from the elements and other benefits provided by the enclosure 1000.

Figure 24:
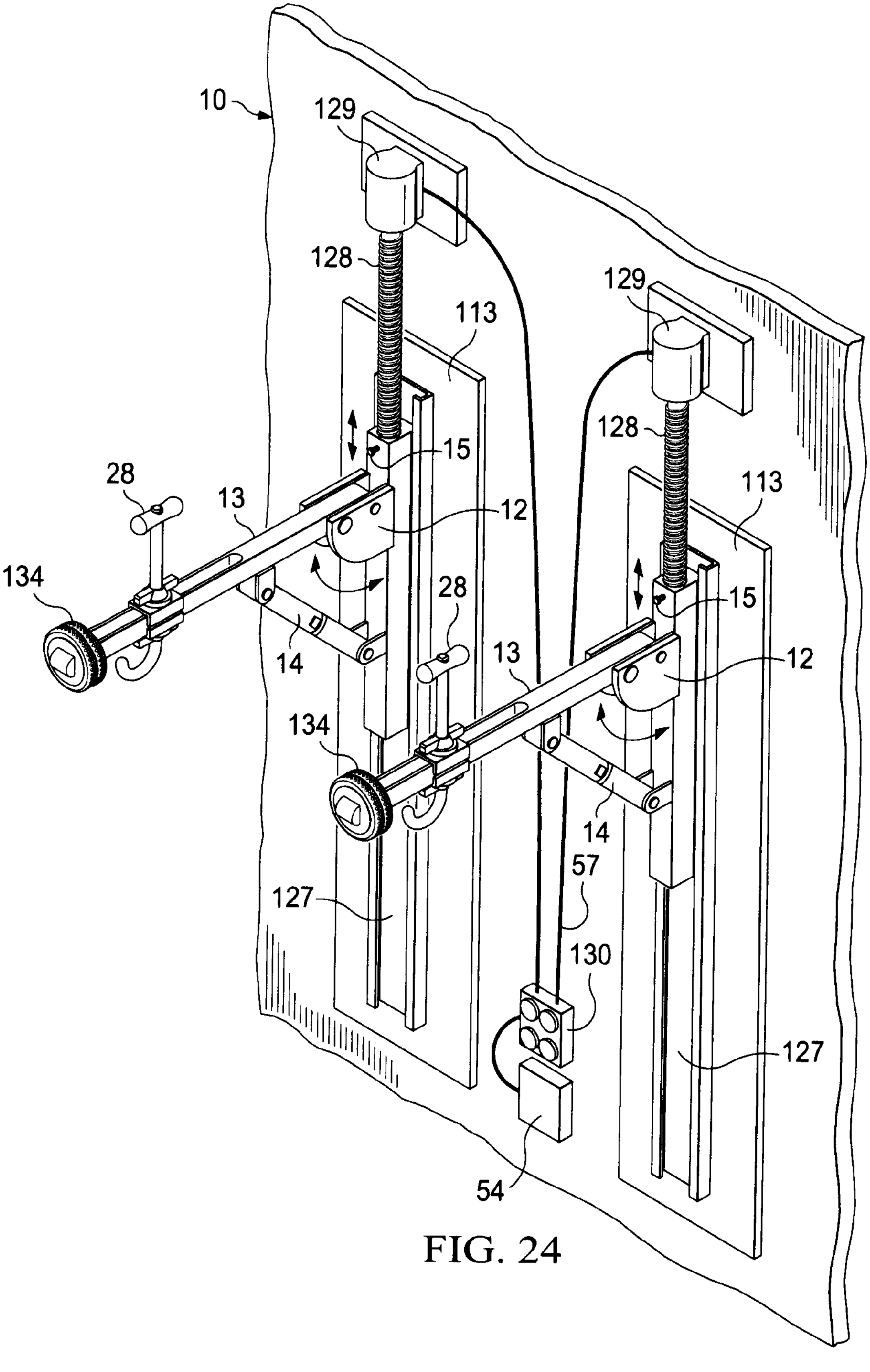
FIG. 24 is a perspective view of a portion of the interior of a handicap access device illustrating how the device may attach to an ATV or other transportation device.

In another embodiment, the enclosure 1000 may be attached to the ATV 44 and adjusted for height for transportation without the necessity of a telescopic upper portion 10 and lower portion 11. For example, FIG. 24 illustrates the interior portion of such an embodiment with attachment means on the upper portion 10. A powered control box 129 can be seen interfitting with a latch platform 13 and clamps 28. In the present embodiment, lock rings 134 may be provided to prevent lateral slippage when attached to the ATV 44. A lock hinge 12 may be provided for further adjustment of the latch platform 13.

Figure 23:
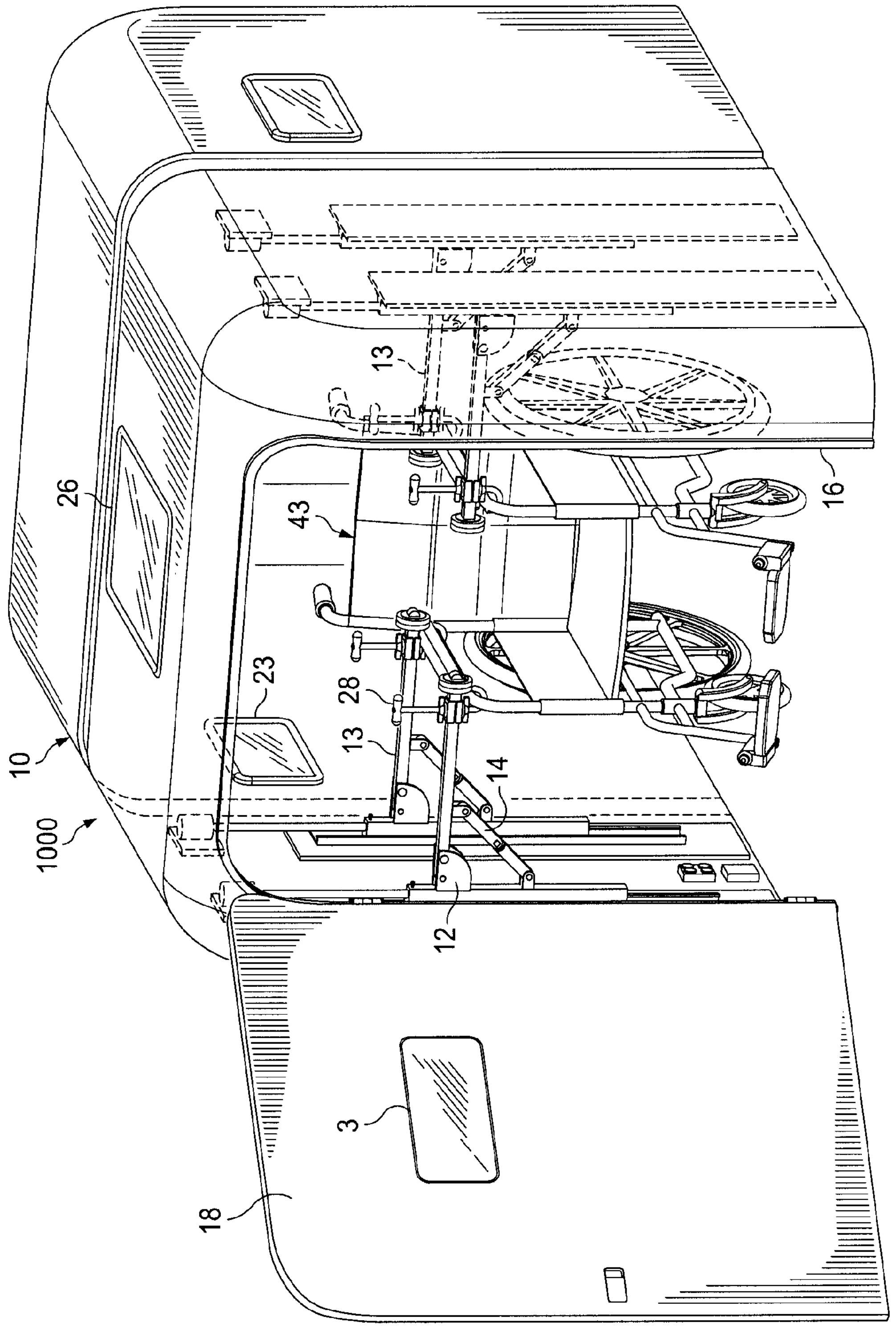
FIG. 23 is a front view of a handicap access device utilizing a wheelchair.

It will be appreciated that other embodiments may be sized to fit different personal mobility vehicles. For example, with reference to FIG. 23, it can be seen that the enclosure 1000 may be sized to fit a wheel chair. Additionally, some embodiments will be constructed in a telescopic fashion so as to be adjustable for width or length instead of or in addition to, height as described above.

The materials used in construction of the device 1000 may vary in accordance with its intended use and the vehicle being used to carry it. For example, a large high powered ATV 44 may support a relatively robust and heavy embodiment. On the other hand, if the enclosure 1000 is intended for use on a manually powered wheel chair, it may be constructed of lighter materials including but not limited to lightweight woods or even sturdy fabrics such as denier or canvas that have been weather treated and attached to a frame.

In some instances, it may be useful to leave the ATV 44 attached to the enclosure 1000 or for other reasons the user may desire to enter or leave the enclosure 1000 without use of the ATV. In such case and for other reasons, the device 1000 may be provided with a winch system that may include a winch motor 78, a winch rail box 79, a winch axle 80, a winch pulley 81, and winch cable 82. In the present embodiment, the winch cable 82 is connected to a handicap pickup belt 83. Depending upon the level of assistance needed by the user, the handicap pickup belt 83 could also be replaced with a full body harness or another device providing additional retention and control.

Figure 21:
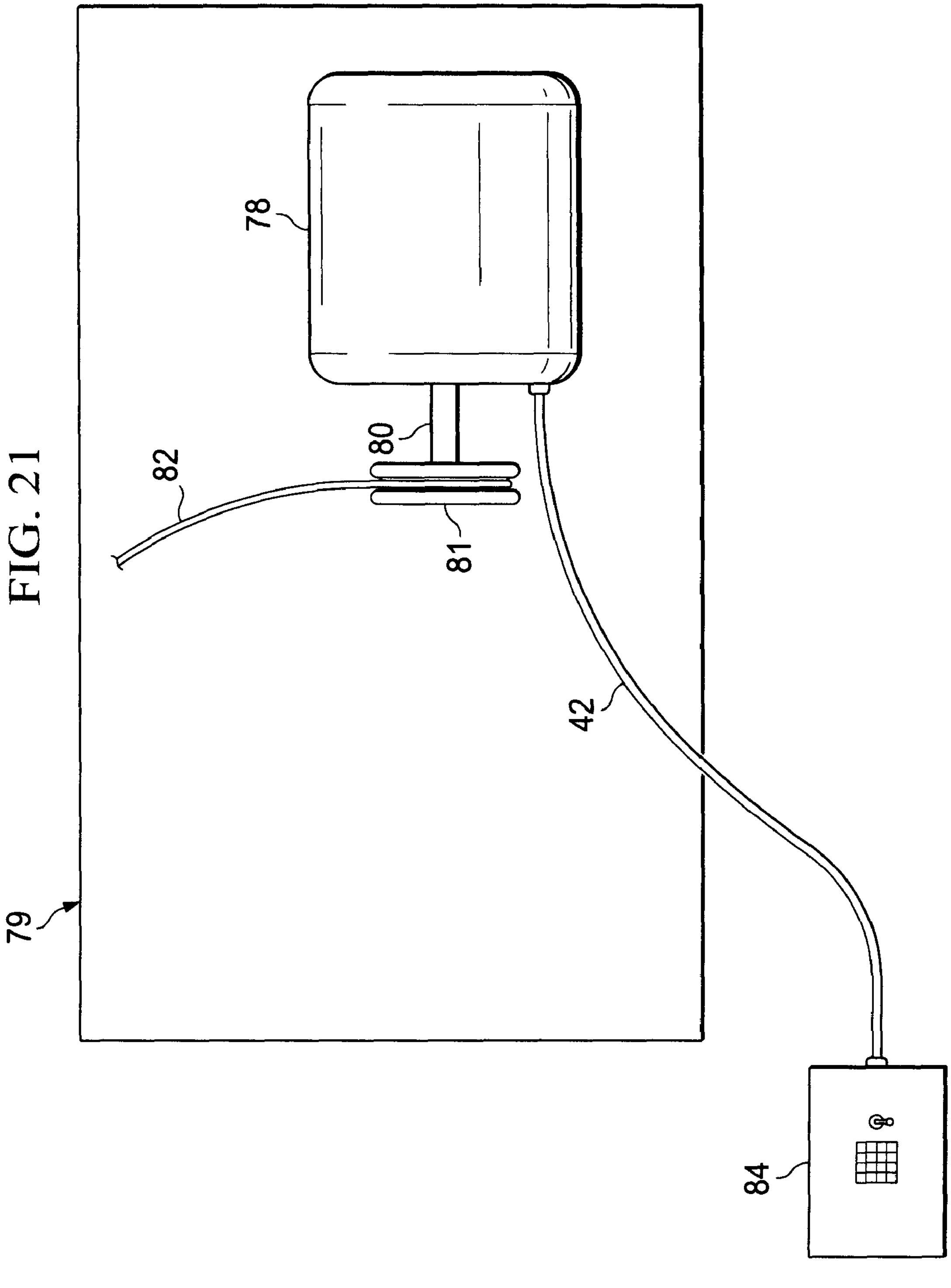
FIG. 21 is a schematic diagram of a winch and control apparatus utilized to move a person into and out of the handicap access device.

Referring now also to FIG. 21, it may be seen that the winch system may be controlled by a winch control box 84 connected by control wiring 42 to the winch motor 78 and the remainder of the system. In some embodiments, the wiring 42 will be of sufficient length to allow the user to operate the winch system from inside or from outside the enclosure 1000.

Figure 8:
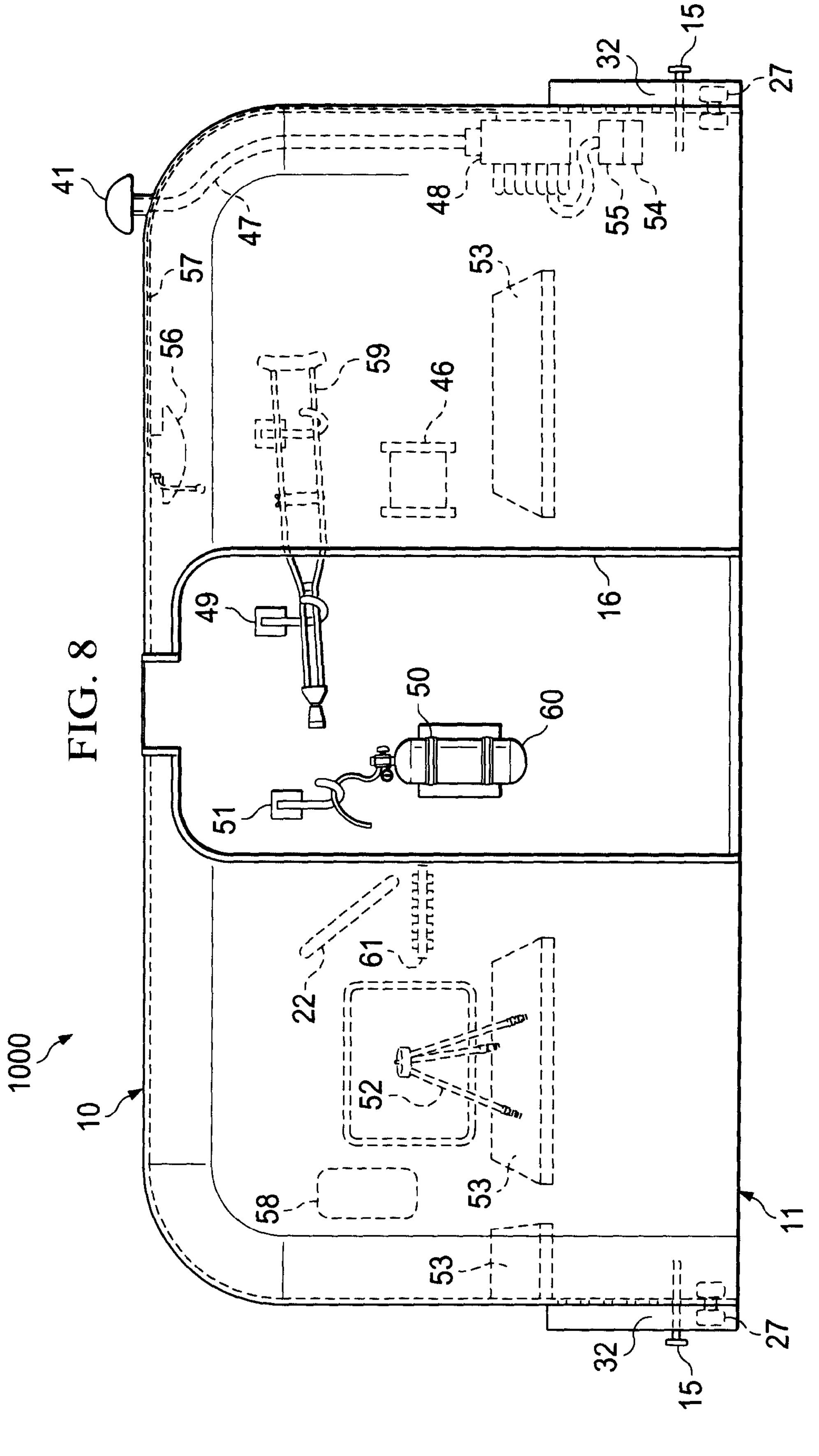
FIG. 8 is another side cutout view of the device of FIG. 1 illustrating exemplary medical supply holders.

It will be appreciated that the enclosure 1000 provides a number of additional enhancements and features, some or all of which may be included in various embodiments. For example, some embodiments will be equipped with observation doors 26, as well as sliding windows 24, as shown in window frames 23. Exterior features, such as lighting 40, are also contemplated. As can be seen with reference to FIG. 8, for example, for the oxygen dependent an oxygen bottle holder 50 may be provided along with an oxygen bottle 60. Handicap rails 22 may also be provided, as well as a number of platforms or fold down storage tables 53. It can be seen that the present embodiment provides crutch holders 49 with crutches 59. Internal lighting 56 may also be provided.

Figure 9:
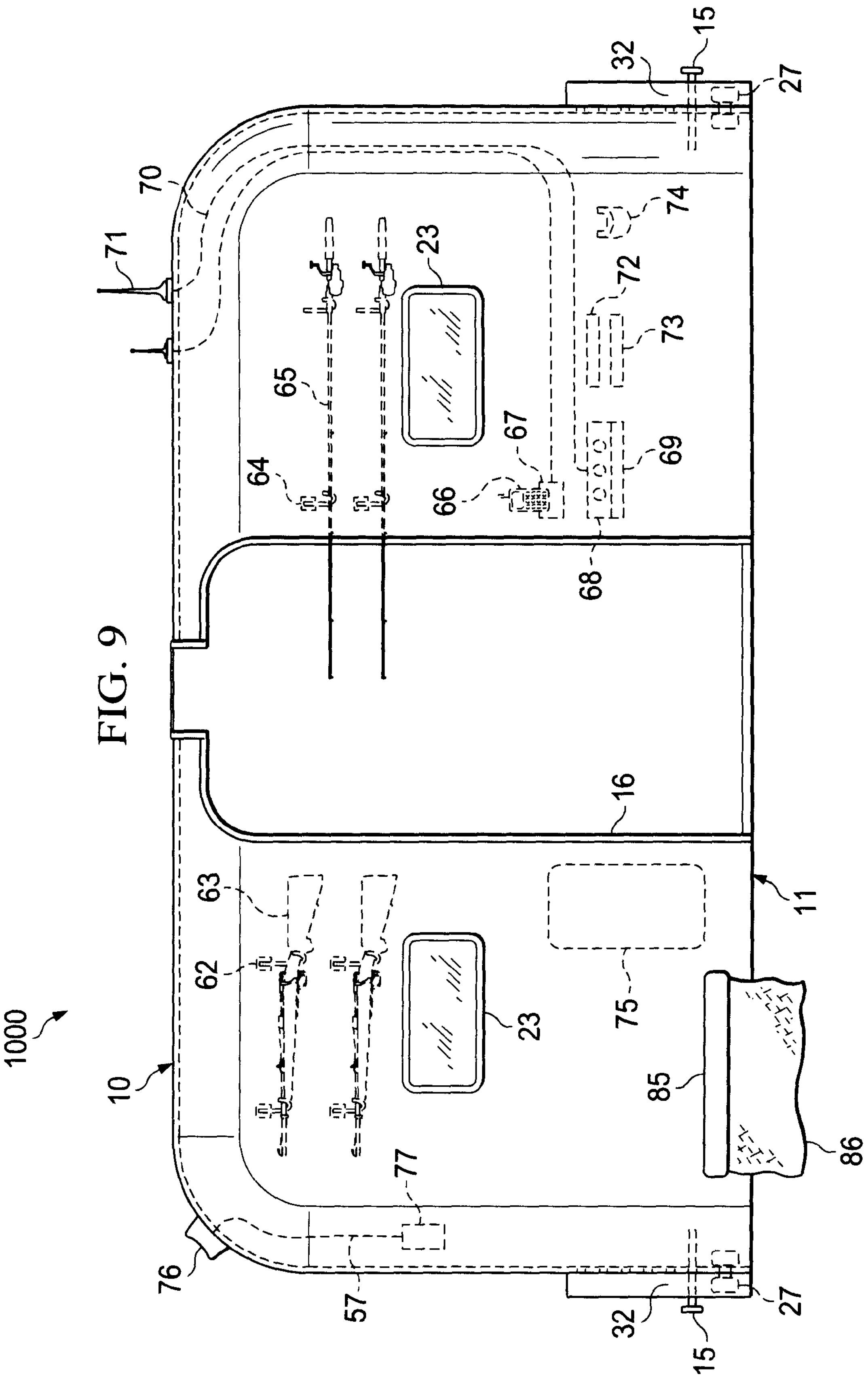
FIG. 9 is another side cutaway view of the device of FIG. 1 illustrating exemplary placement of emergency equipment and firearms.

Examples of other interior features may include, but are not limited to, hot and cold storage 46, an ammunition or film holder 61, a camera or gun stabilizer 52, and a medical dry box 58. With reference now also to FIG. 9, other examples may include gun holder 62 shown with guns 63, CB radio 68 shown with CB radio holder 69 connecting via coax cable 70 to communication antenna 71. Also shown is rod holder 64 with fishing rods 65. A cell phone holder 67 may be provided for a cell phone shown as 66. It will be appreciated that the device 1000 is adaptable to hold a wide variety of medical supplies including, but not limited to, the glucometer holder 72 and the glucogon holder 73. Convenience devices may also be provided, such as a drink holder 74 and/or an ice box or cooler 75.

Climate controls may also be provided, as shown by the ventilation tubing 47, vent 41 and heating and cooling unit 48. It is understood that many of the devices and accessories within the device 1000 may rely on battery power. Therefore, a battery 55 and battery box 54 may be provided but are not necessarily the only power source available within the device 1000.

In addition to convenience features, it will be appreciated that the mobility device 1000 also provides numerous safety features in its various embodiments. Referring to FIG. 7 for one example, a wheelchair storage platform 30 may be provided for storing a manual foldable wheelchair 43. In this way, a user of the mobility device 1000 will never be completely without means of mobility even in the event of a mechanical breakdown or failure.

Figure 10:
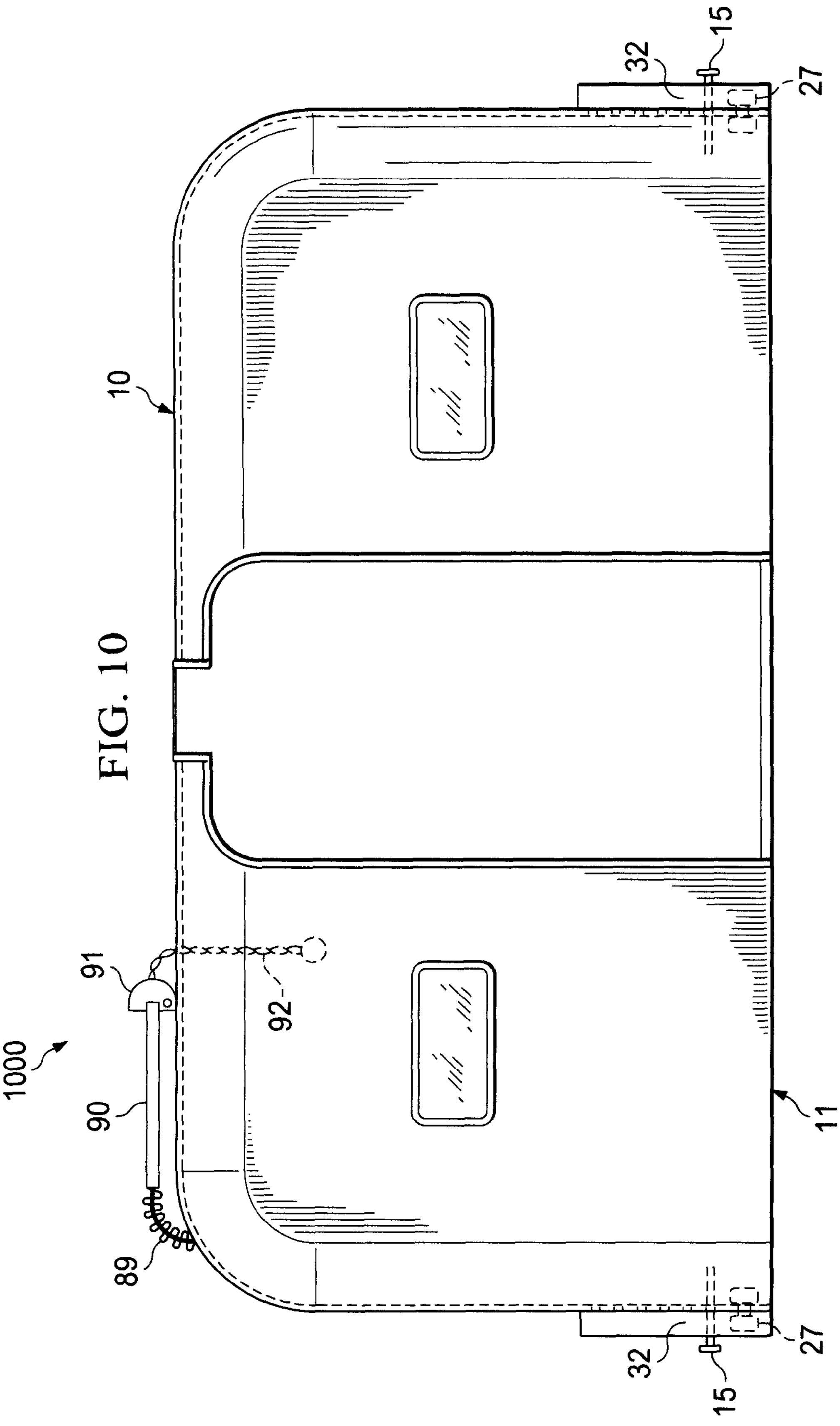
FIG. 10 is a side view of a handicap mobility device with an attached help sign.

Referring now to FIG. 10, a help signal or help sign 90 that may be spring loaded by coil spring 89 may be activated within the device 1000 by activating the release lock system 91 by a help sign release rope 92. In this manner, a user that becomes immobile or otherwise in need of aid while within the device 1000 may be able to signal to others nearby from within the device 1000. It will also be appreciated that the cell phone holder 67 and/or CB radio 68 within the device 1000, as previously mentioned, may also be considered as safety communication aids.

Figure 19:
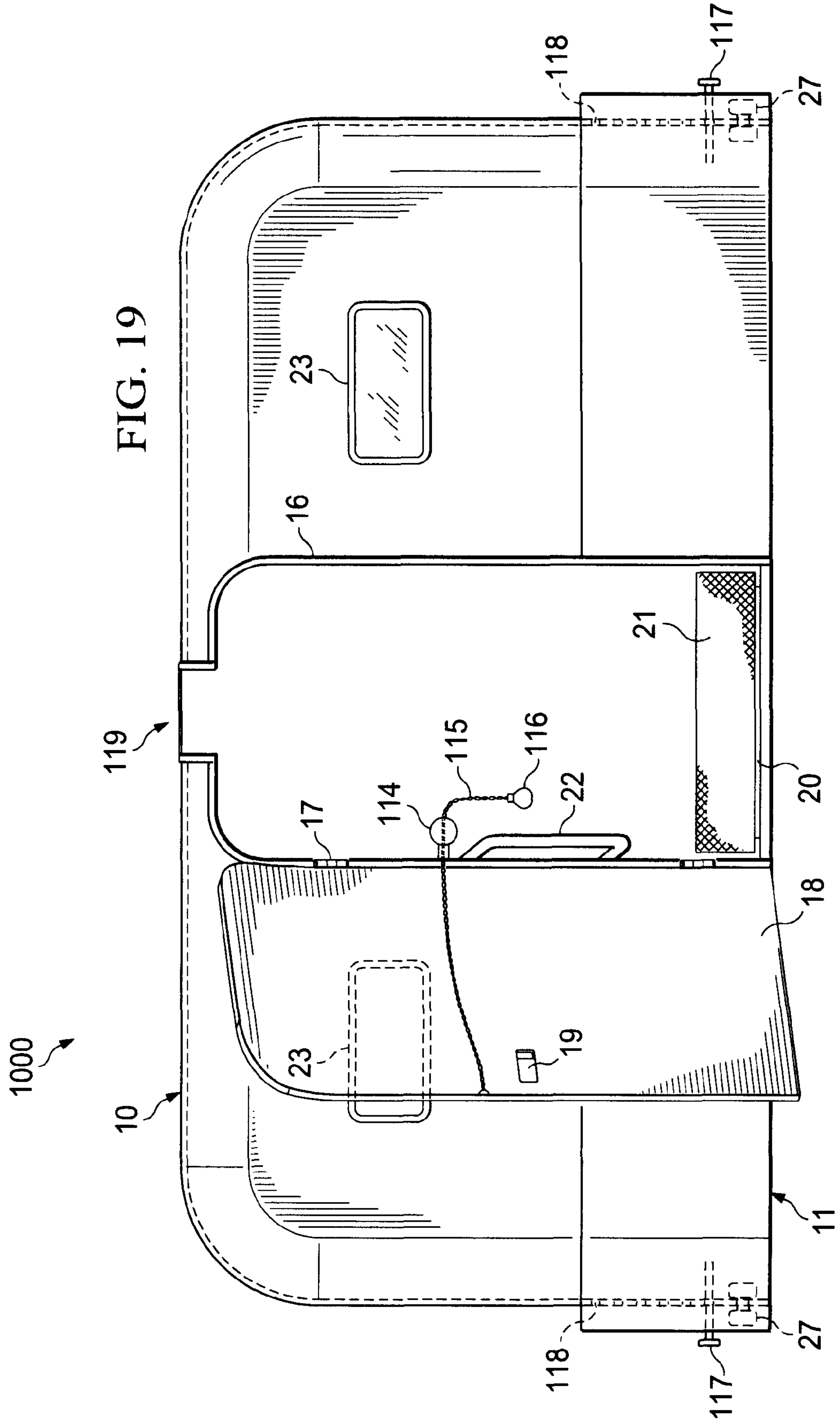
FIG. 19 is a side view of a handicap access device illustrating an exemplary configuration of a side door.
Figure 20:
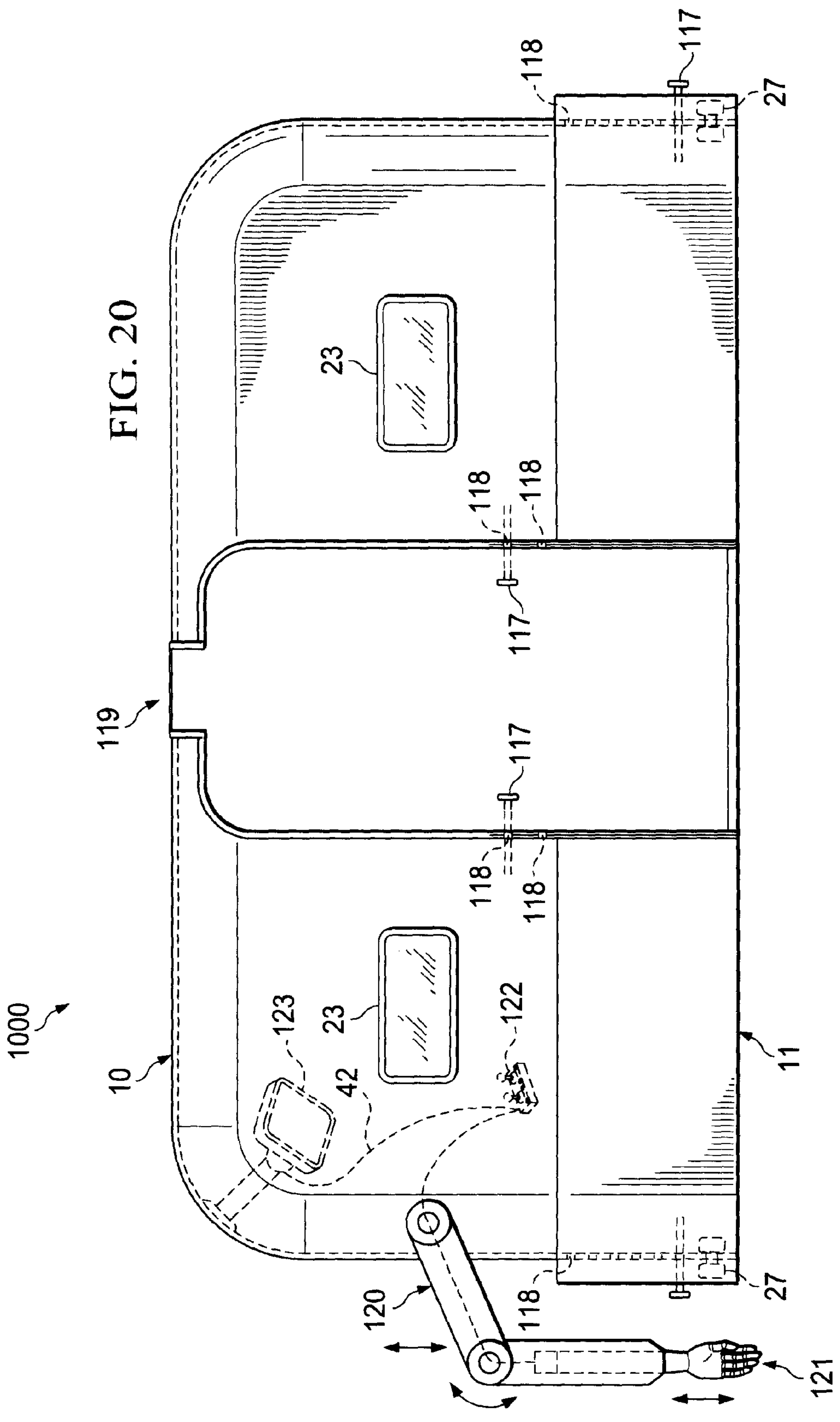
FIG. 20 is a side view of a handicap access device illustrating exemplary placement of a robotic work arm.

As a further example of safety and convenience features, reference is made to FIG. 19. Here it can be seen that a door 18 may be equipped with a pull handle 116 attached by cable 115 to aid a use in closing the door. A lower door 21 may also be provided on a pivot rod 20. In this way, the device 1000 may be completely enclosed, regardless of the adjusted height. FIG. 20 illustrates the integration of a robotic arm assembly 120 with a robotic hand assembly 121. This enables a user to manipulate objects outside the enclosure 1000 without leaving.

Figure 6:
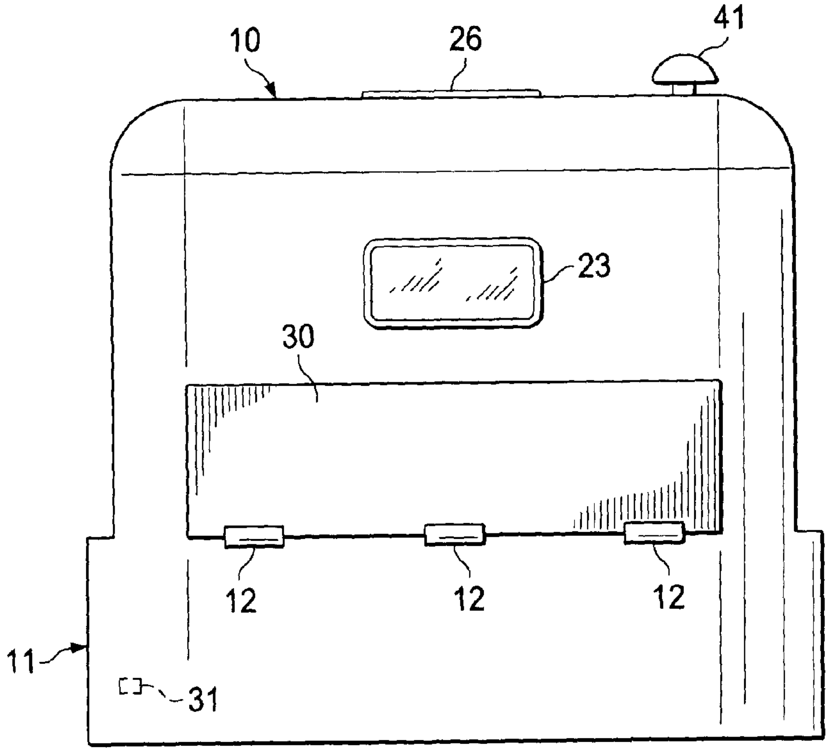
FIG. 6 is a back end view of the device of FIG. 1.

Referring now to FIG. 6, a side view of the device 1000 equipped with a stabilization system is shown. In the present embodiment, the stabilization system is an electrically powered system comprising a number of stabilization legs. In the present embodiment, the stabilization legs include three components, namely the female stabilizer 135, the male/female stabilizer 136, and the male stabilizer 137. It will be appreciated that the aforementioned components operate together in a telescopic fashion to allow the device 1000 to be self-righting in the event of a tip over. In the present embodiment, the self-righting system is electronically activated and may be utilized by access to the height control switch 130. This may be wired by wiring 57 to battery 55 and battery box 54, which in turn powers the stabilizer system. Although only one side of the device 1000 is shown with a safety stabilizing system, it will be appreciated that two or more sides may be so equipped to enable the user to self-right the device 1000 from a tipped position or from any position that is likely to result in tipping.

Figure 11:
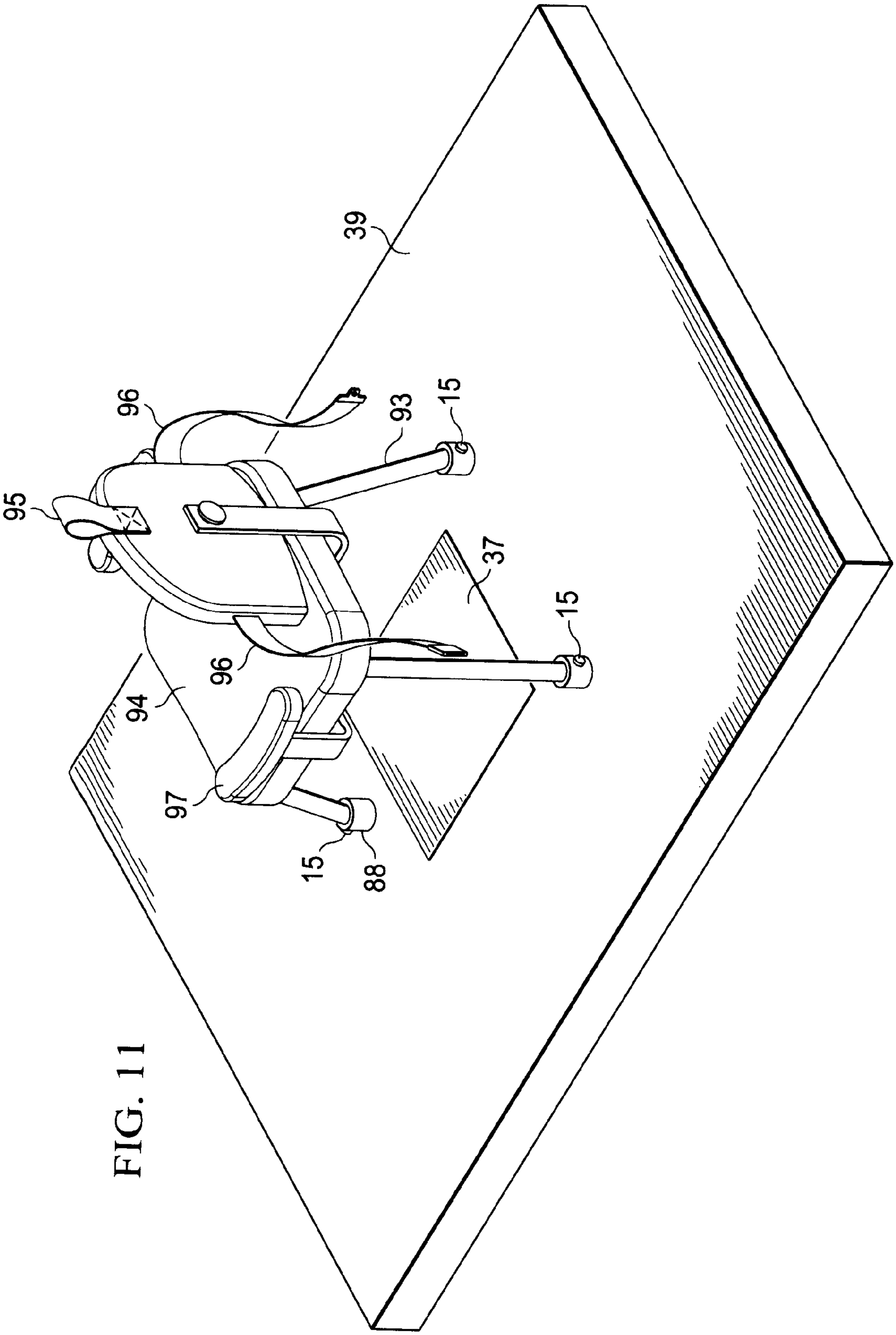
FIG. 11 is a side perspective view of a floor insert for a handicap mobility device.
Figure 12:
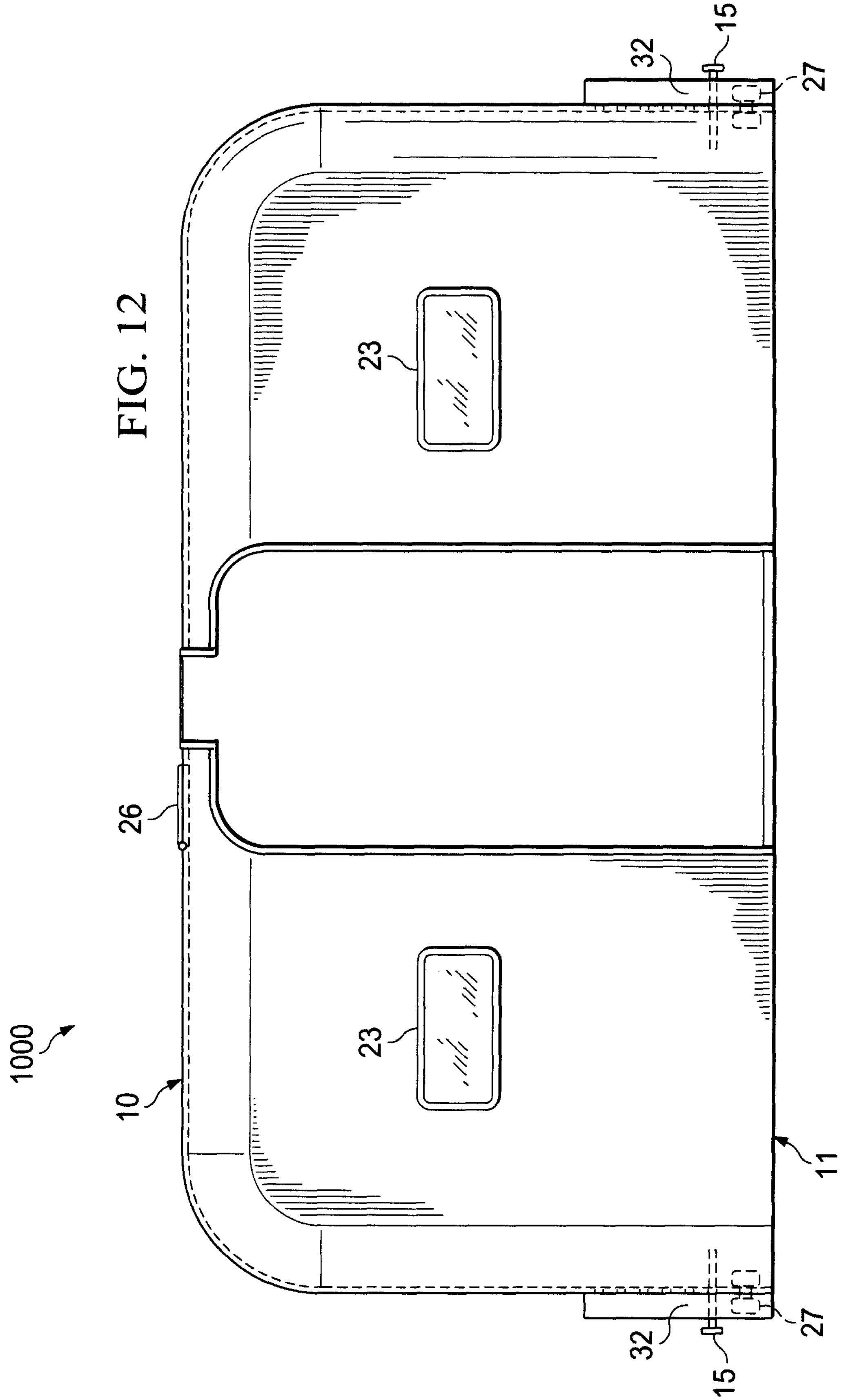
FIG. 12 is an opposite side view of FIG. 10.
Figure 13:
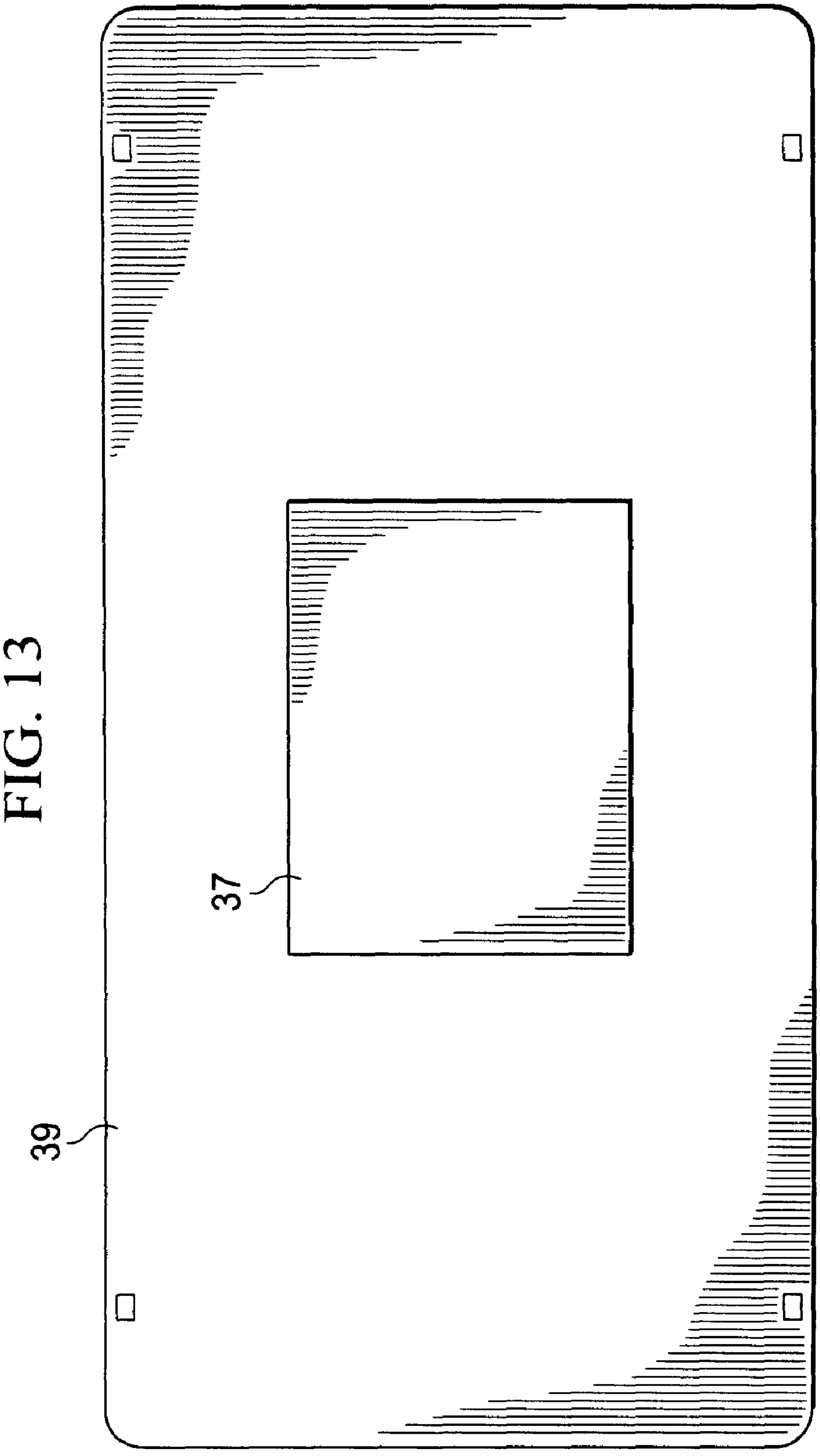
FIG. 13 is a top view of a floor of a handicap access device showing an exemplary placement of a floor door.
Figure 14:
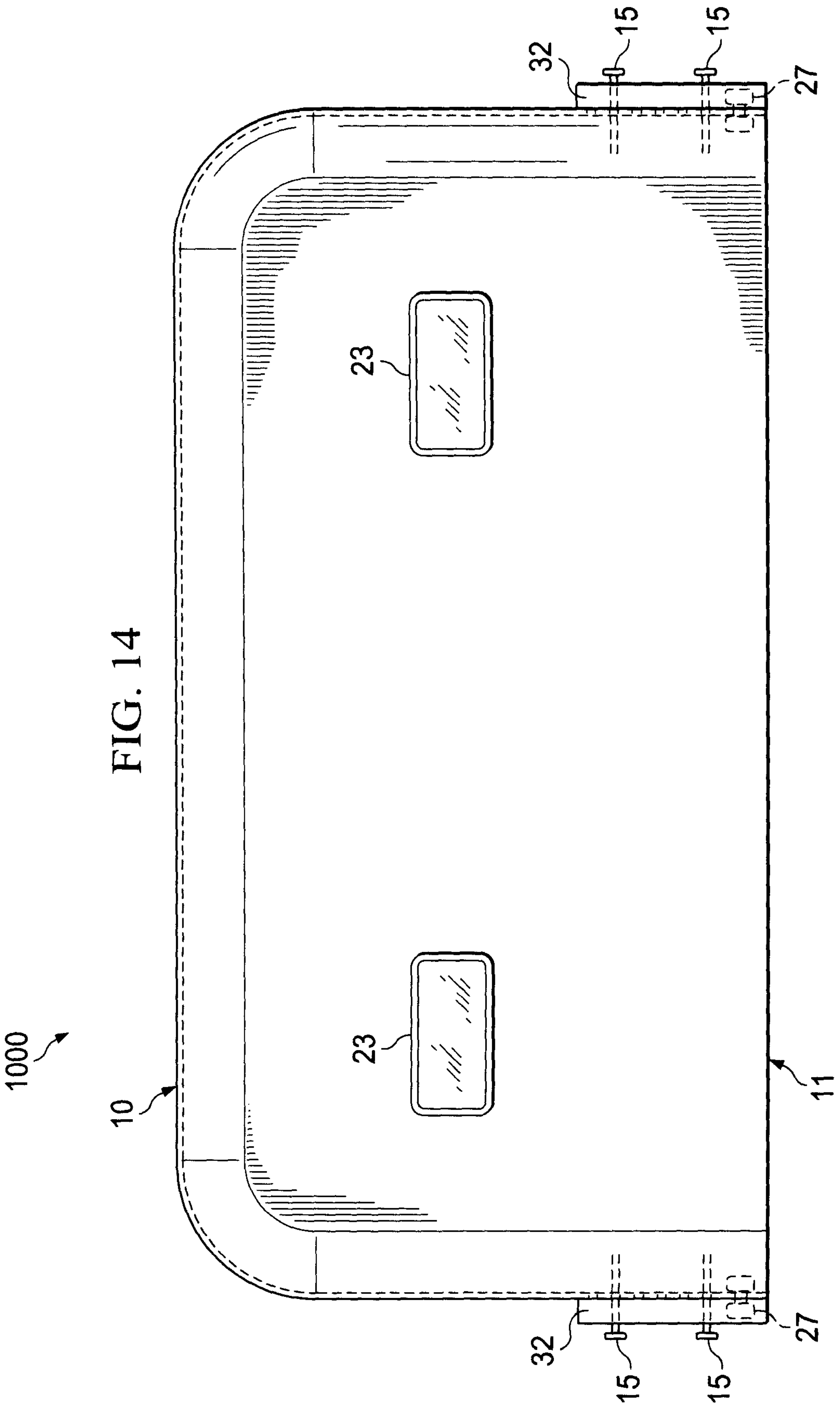
FIG. 14 is another opposite side view.
Figure 15:
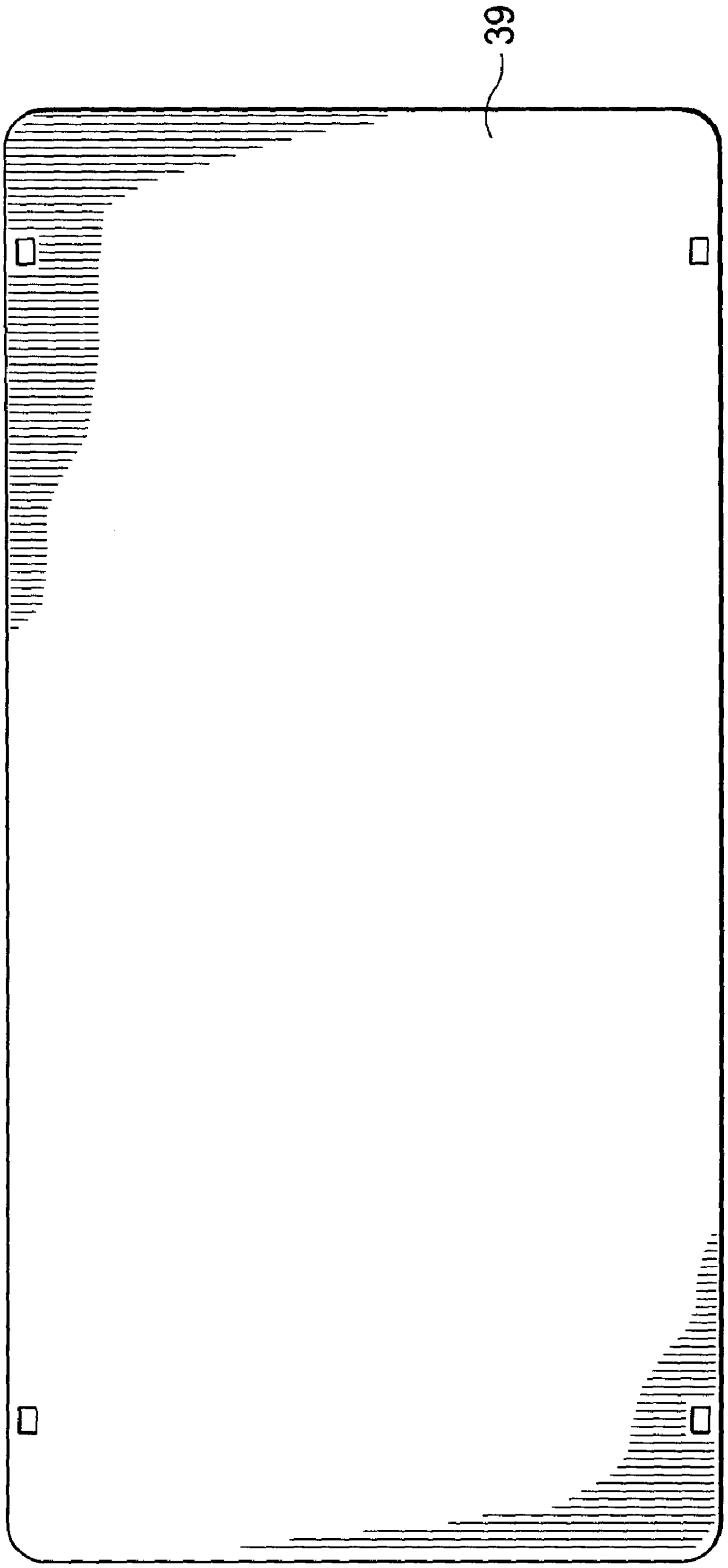
FIG. 15 is a top view of an inner floor of a handicap device without a floor door.
Figure 16:
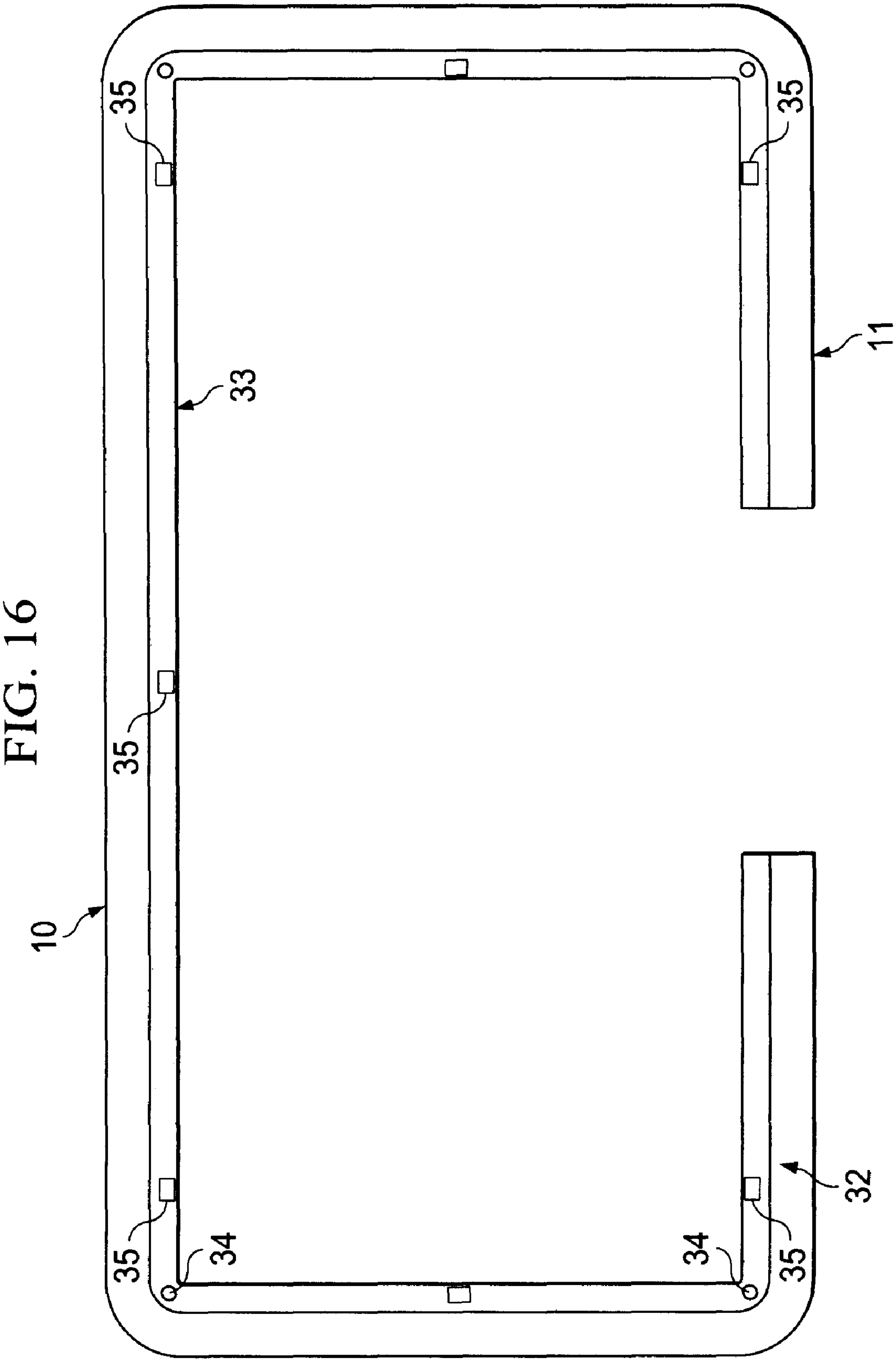
FIG. 16 is a top view of a bottom half of a handicap access device.
Figure 17:
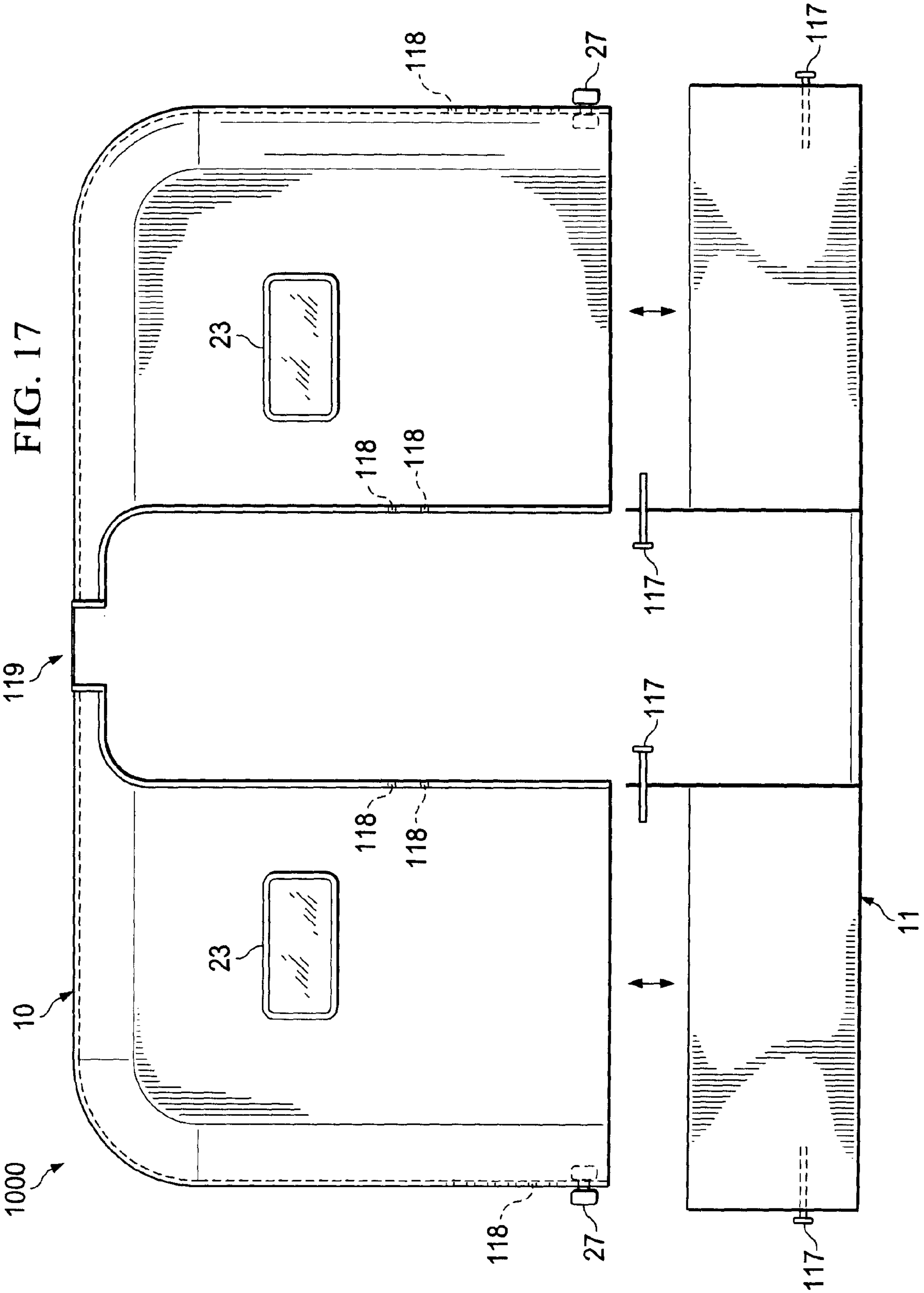
FIG. 17 is an exploded side view of the handicap access device of FIG. 1.
Figure 18:
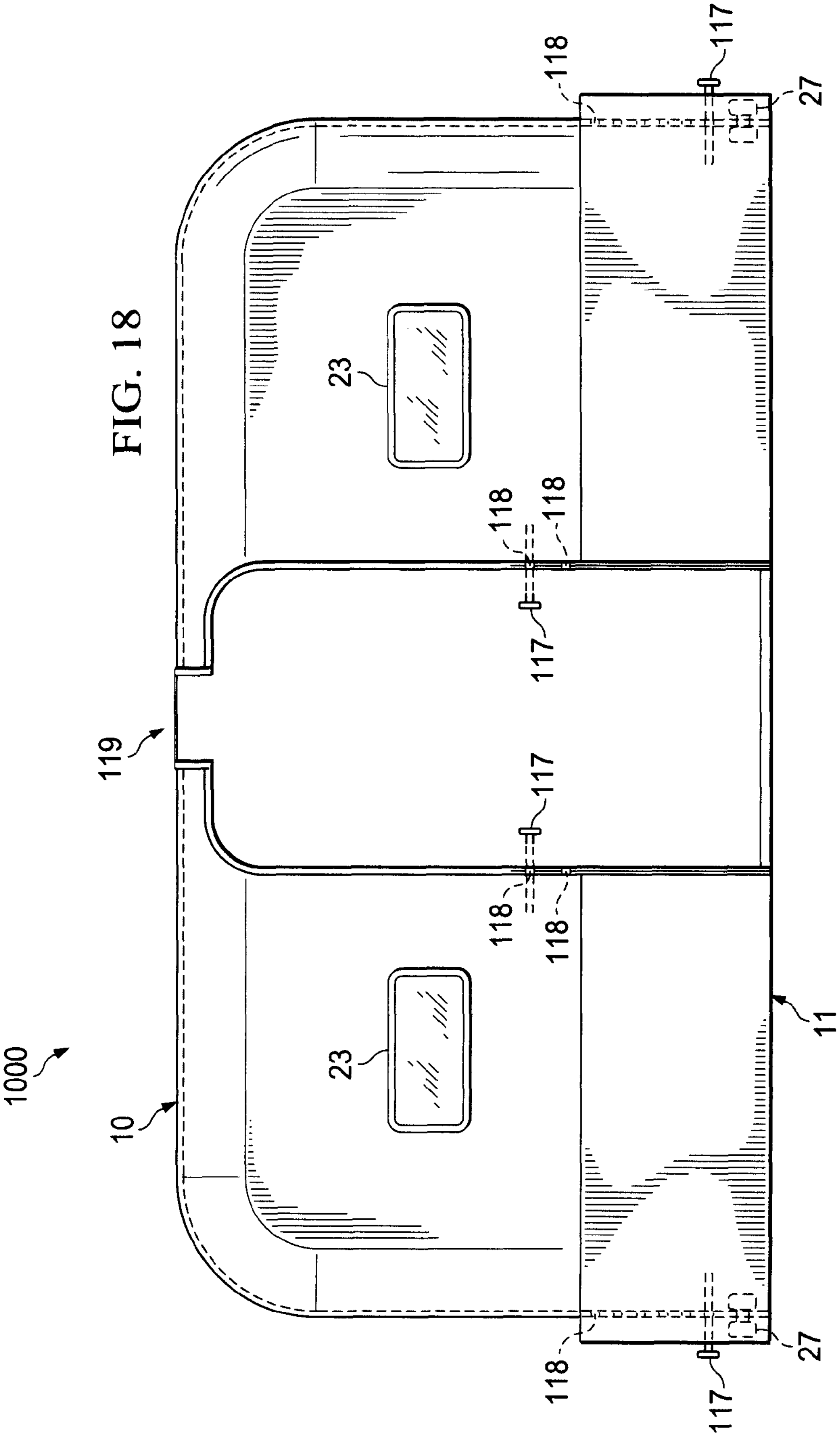
FIG. 18 is another side view illustrating top and bottom halves of a handicap access device fitted together.
Figure 27:
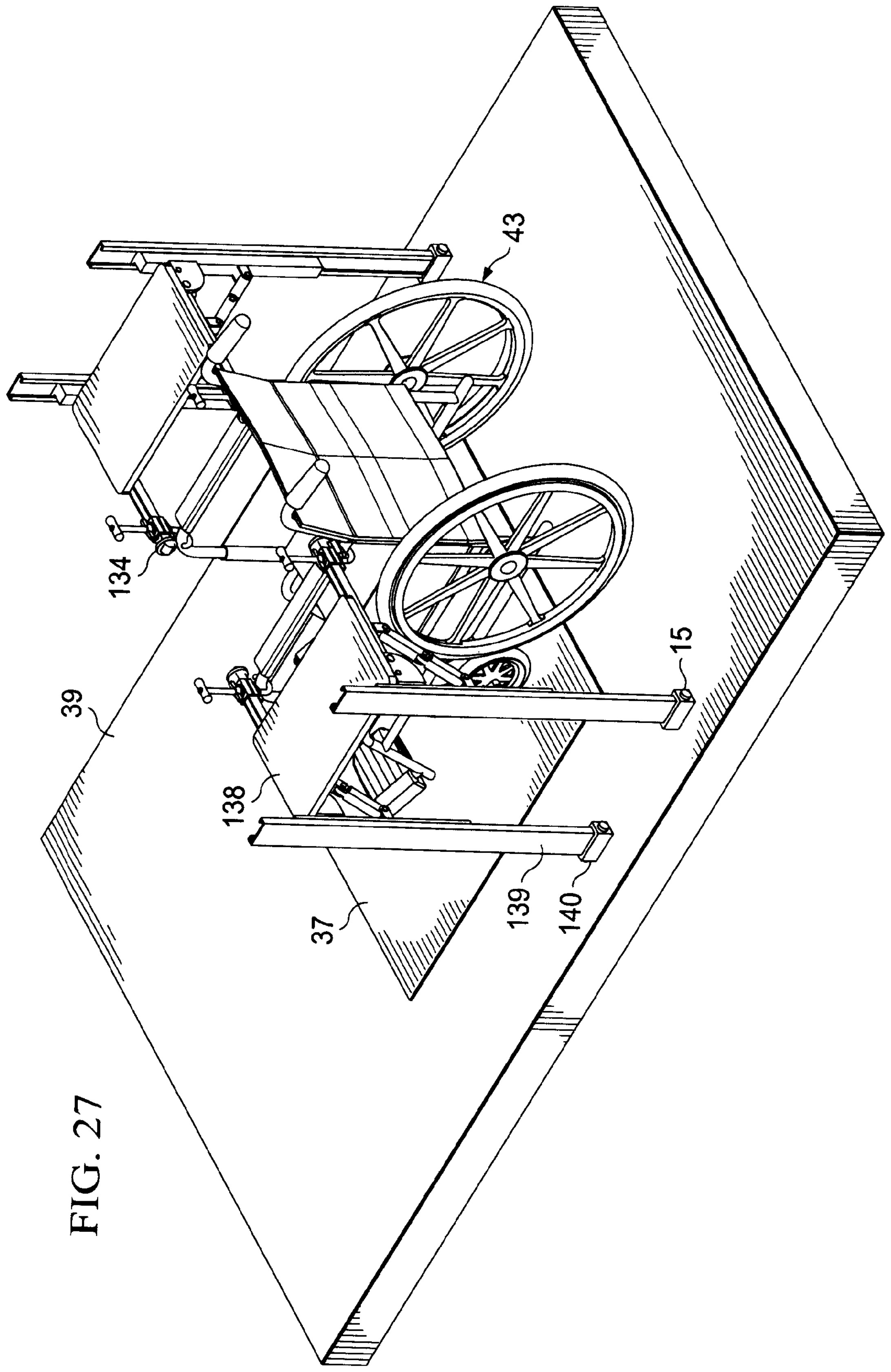
FIG. 27 is a perspective view of an inner floor of a handicap access device providing a wheelchair stabilizer.

The device 1000 of the present disclosure will be modular in some embodiments. For example, with reference now to FIG. 11, a floor piece is shown. The floor piece 39 may be placed within the device 1000 to allow the device to be used as a stationary protective structure. A bottom access door 37 may be provided on the floor piece 39 if needed or desired. A number of lock pins 15 may secure a handicap chair 94 to the floor piece 39. Other aids may also be provided, including but not limited to, a handicap chair railing 97, a safety belt 96, and a winch pick-up 95. The winch pick-up 95 may be utilized to lift the chair into and out of the enclosure 1000 utilizing the winch system as previously discussed. FIG. 27 illustrates another embodiment where the floor piece 39 is adapted to secure a wheel chair 43.

Figure 25:
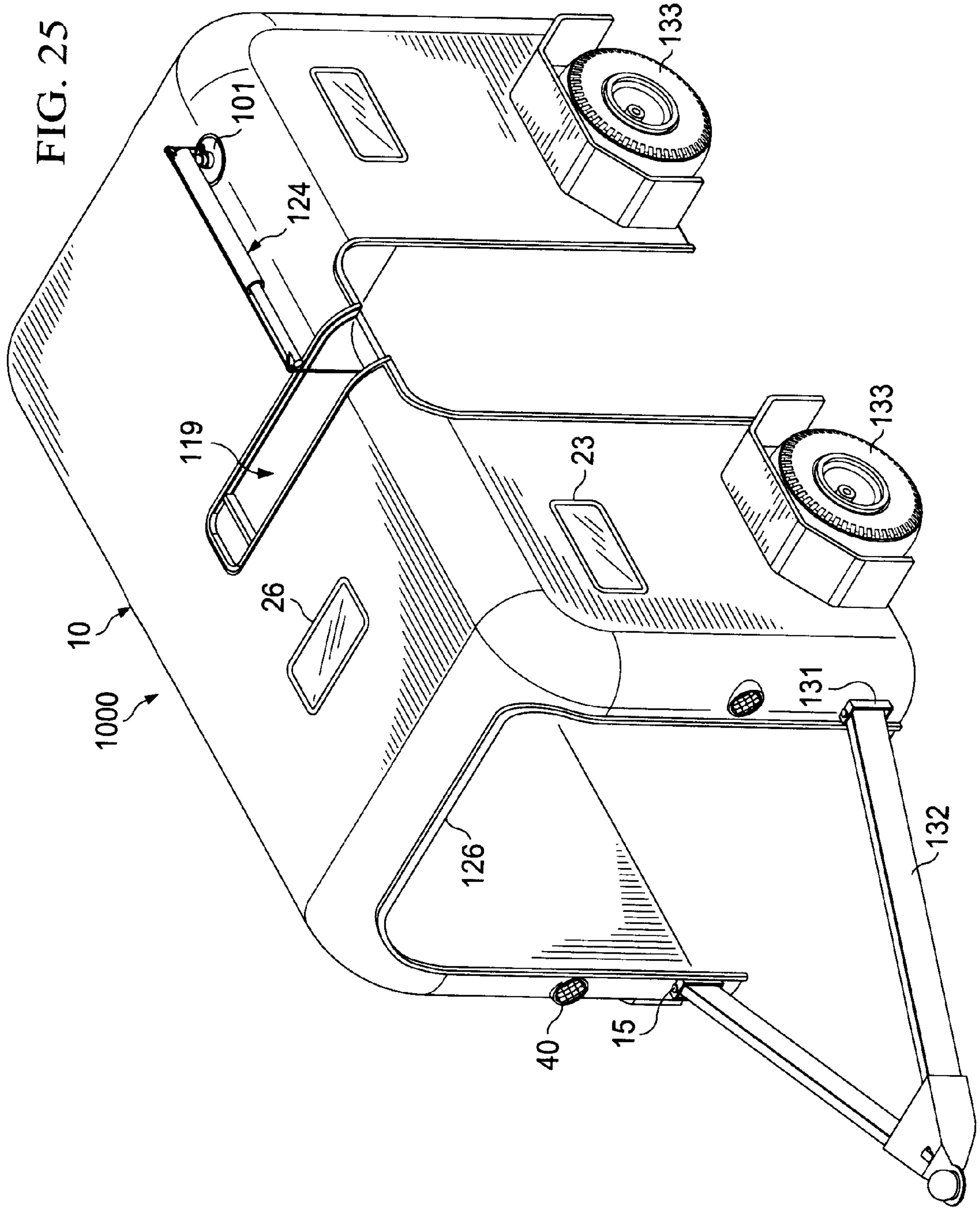
FIG. 25 is an end perspective view of an embodiment of a handicap access device providing a set of wheels and a transportation hitch.
Figure 26:
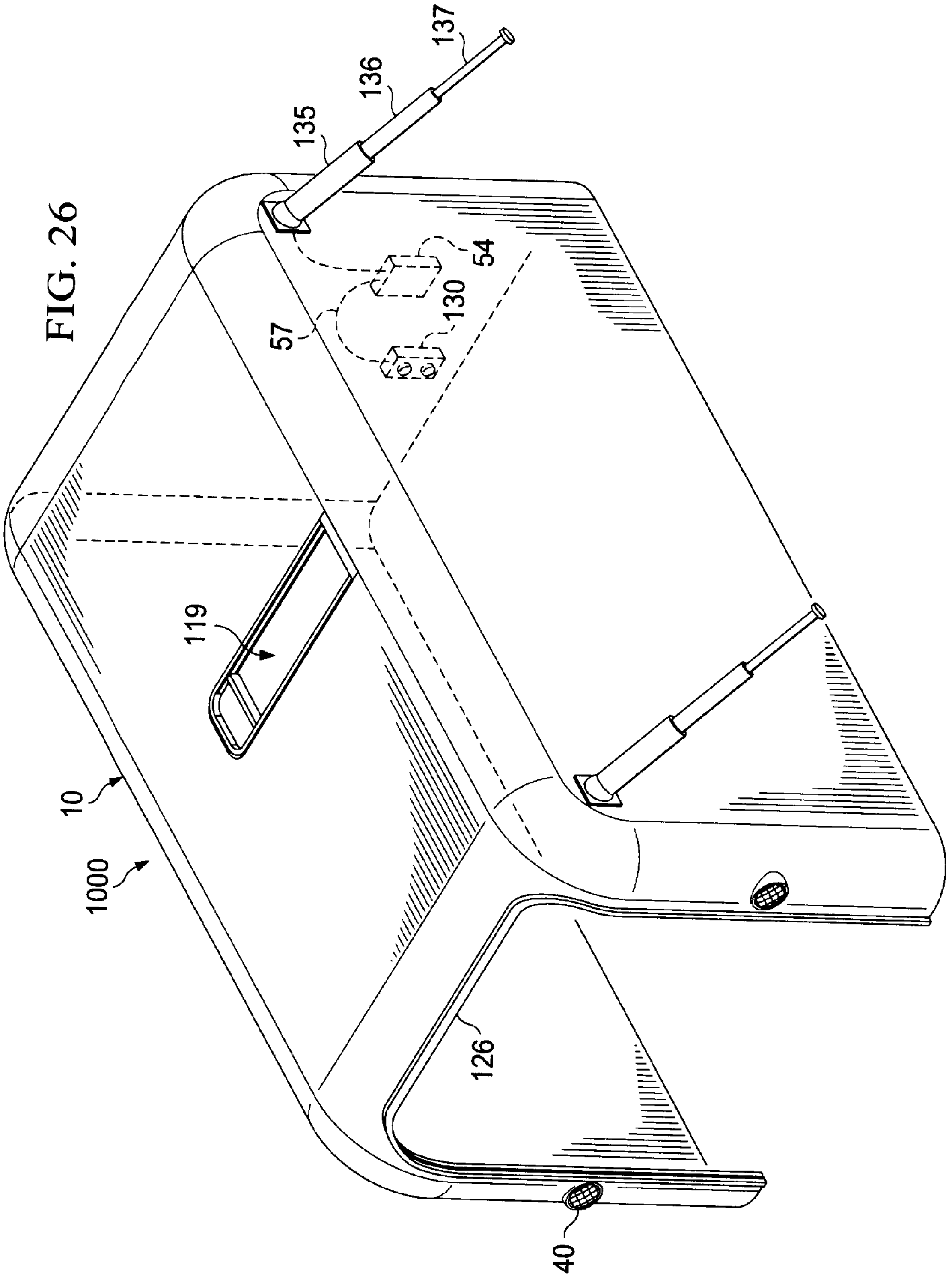
FIG. 26 is a perspective view of a handicap access device with a self-righting apparatus.

In addition to having an optional floor system for converting the device 1000 into a stationary enclosure, the device may also be equipped, as shown in FIG. 25, with wheels 133 and/or a hitch 132. This may allow the device 1000 to be transported or towed with the aid of another vehicle. In some embodiments, the floor piece 39 may also be utilized with the embodiment shown in FIG. 25, resulting in a mobility trailer.

It will be appreciated from the examples given that the mobility system 1000 is widely adaptable for a variety of uses. To provide further examples of specific embodiments, a number of additional figures are included with the present disclosure. To aid the reader in more fully understanding the various specific embodiments, a parts list is also provided herein as Table 1. Those of skill in the art will readily understand the included drawings in conjunction with the parts list and the detailed description given above to easily adapt the designs disclosed herein to other uses within the scope and spirit of the present disclosure.

TABLE 1

| | |
|---|---|
| 10 | upper portion |
| 11 | lower portion |
| 12 | lock hinge |
| 13 | latch platform |
| 14 | latch platform brace |
| 15 | lock pin |
| 16 | door frame |
| 17 | door hinge |
| 18 | upper door |
| 19 | door hasp |
| 20 | upper/lower door pivot rod |
| 21 | lower door |
| 22 | handicap rail |
| 23 | window frame |
| 24 | slide windows |
| 25 | observation door hinge |
| 26 | observation door |
| 27 | adjustment rollers |
| 28 | clamp tightener |
| 29 | secure clamp |
| 30 | handicap wheelchair storage platform |
| 31 | female platform lock |
| 32 | internal track |
| 33 | inside floor support |
| 34 | anchor hole |
| 35 | inner floor studs |
| 36 | inner floor female lock |
| 37 | bottom access door |
| 38 | door handles |
| 39 | inner floor - removable |
| 40 | lights |
| 41 | vent |
| 42 | wiring |
| 43 | wheelchair |
| 44 | ATV |
| 45 | pull handle |
| 46 | hot/cold medical climate control storage |
| 47 | tubing ventilation |
| 48 | heat/cool unit |
| 49 | crutch holder |
| 50 | oxygen bottle holder |

TABLE 1-continued

| | |
|---|---|
| 51 | medical support holder |
| 52 | camera/gun stabilizer |
| 53 | fold down storage table |
| 54 | battery box holder |
| 55 | battery |
| 56 | internal light |
| 57 | wiring |
| 58 | medical dry box |
| 59 | crutch |
| 60 | oxygen bottle |
| 61 | ammunition/film holder |
| 62 | gun holder |
| 63 | gun |
| 64 | fishing pole holder |
| 65 | fishing pole |
| 66 | cell phone |
| 67 | cell phone holder |
| 68 | CB radio |
| 69 | CB radio holder |
| 70 | coax |
| 71 | communication antenna |
| 72 | glucometer holder |
| 73 | glucagon holder |
| 74 | drink holder |
| 75 | ice box |
| 76 | alert speaker |
| 77 | alert roll over control box |
| 78 | winch motor |
| 79 | winch rail box |
| 80 | winch axle |
| 81 | winch pulley |
| 82 | winch cable |
| 83 | handicap pick up belt |
| 84 | winch control box |
| 85 | wind curtain holder |
| 86 | wind curtain |
| 87 | mirror |
| 88 | female chair holder |
| 89 | coil spring |
| 90 | help sign |
| 91 | release lock system |
| 92 | help sign release rope |
| 93 | male chair holder |
| 94 | handicap chair |
| 95 | winch pickup |
| 96 | safety belt |
| 97 | handicap chair railing |
| 98 | axle |
| 99 | height adjustment holes |
| 100 | ATV racks |
| 101 | winch pivot |
| 102 | screw motor |
| 103 | female screw box |
| 104 | male screw adjustment |
| 105 | female sleeve box |
| 106 | male slide box |
| 107 | cable guide |
| 108 | motor housing |
| 109 | observation camera |
| 110 | observation camera screen |
| 111 | door housing male lock system |
| 112 | female housing for male lock system |
| 113 | secure safety plate |
| 114 | door pull guide |
| 115 | door pull cable |
| 116 | door pull handle |
| 117 | male adjustable height pins |
| 118 | female adjustable height receiver openings |
| 119 | winch pivot cable slide opening |
| 120 | robotic arm assembly |
| 121 | robotic hand assembly |
| 122 | robotic arm/hand control box |
| 123 | robotic arm/hand monitor screen |
| 124 | winch control arm |
| 125 | housing box for portability |
| 126 | equipment front access door frame |
| 127 | female housing |
| 128 | adjustable powered height control |
| 129 | adjustable powered control box |
| 130 | adjustable height control switch |
| 131 | female hitch receiver |
| 132 | male hitch |
| 133 | removable portable wheels |
| 134 | lock band |
| 135 | safety powered female stabilizer |
| 136 | safety male/female stabilizer arm |
| 137 | safety male stabilizer |
| 138 | wheelchair stabilizer and adjustable tray |
| 139 | male wheelchair stabilizer holder |
| 140 | female wheelchair stabilizer |

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An enhanced mobility device, comprising:

a free standing enclosure defining an interior and an exterior and having a substantially open floor;

at least one access opening defined by the enclosure that is sized and located to allow wheeled passage of a ride-on, four wheeled all terrain vehicle between the exterior and interior; and a plurality of clamps attached to the interior of the enclosure, the plurality of clamps configured to attach to a cargo rack of the all terrain vehicle;

wherein with the all terrain vehicle within the interior of the enclosure, the enclosure is secured to the all terrain vehicle by the plurality of clamps and raised by the clamps relative to the vehicle to allow wheel motion of the all terrain vehicle and the enclosure.

2. The device of claim 1, further comprising a plurality of observation windows in the enclosure.

3. The device of claim 1, wherein the enclosure comprises two pieces in a telescoping arrangement configured to allow adjustment of the enclosure for height.

4. The device of claim 1, wherein the enclosure comprises two pieces in a telescoping arrangement configured to allow for adjustment of the enclosure for length.

5. The device of claim 1, further comprising an emergency signal indicator affixed to the exterior of the enclosure and activated from the interior of the enclosure.

6. The device of claim 1, further comprising a plurality of extendable legs on at least one side of the enclosure for righting the enclosure in the event the enclosure tips onto the at least one side.

7. The device of claim 6, further comprising a help indicator on the outside of the enclosure that is activated from inside the enclosure.

8. The device of claim 1, wherein the enclosure further comprises an upper portion and lower portion in a telescopic arrangement, the upper and lower portions joined with a screw adjustment that adjusts the position of the upper and lower portions relative to one another.

9. An enhanced mobility device, comprising:

a free standing enclosure defining an interior and an exterior and having a substantially open floor;

at least one access opening defined by the enclosure that is sized and located to allow wheeled passage of a wheel chair between the exterior and interior; and a plurality of clamps attached to the interior of the enclosure and adjustable for height relative to the enclosure, the plurality of clamps configured to attach to the wheel chair;

wherein the wheel chair is secured to the interior of the enclosure by the plurality of clamps and the clamps are lowered downward relative to the enclosure thereby elevating the enclosure and placing the weight of the enclosure onto the wheel chair for transportation.

10. An enhanced mobility device, comprising:

a free standing enclosure having an upper portion and a lower portion in a telescopic arrangement and joined by a powered screw adjustment that moves the upper and lower portion toward and away from one another;

an access opening defined in the enclosure; and a plurality of clamps attached to the upper piece of the interior of the enclosure for attaching to a wheeled mobility device;

wherein the access opening is sized to allow wheeled passage of the wheeled mobility device from an exterior to an interior of the enclosure where the mobility device secured to the enclosure for by the plurality of clamps and the powered screw adjustment is activated to withdraw the lower piece toward the upper piece thereby placing the weight of the enclosure onto the wheeled mobility device for transport of the enclosure.

* * * * *